(12) United States Patent
Tokuchi

(10) Patent No.: US 10,970,583 B2
(45) Date of Patent: Apr. 6, 2021

(54) INFORMATION PROCESSING APPARATUS, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 238 days.

(21) Appl. No.: 16/043,176

(22) Filed: Jul. 24, 2018

(65) Prior Publication Data

US 2019/0318192 A1 Oct. 17, 2019

(30) Foreign Application Priority Data

Apr. 17, 2018 (JP) .............................. JP2018-079379

(51) Int. Cl.
*G06K 9/46* (2006.01)
*G09G 5/22* (2006.01)
*G06K 9/32* (2006.01)

(52) U.S. Cl.
CPC ............. *G06K 9/46* (2013.01); *G06K 9/3233* (2013.01); *G09G 5/22* (2013.01)

(58) Field of Classification Search
CPC .......... G06K 9/48; G06F 16/50; G06F 16/583
See application file for complete search history.

(56) References Cited

U.S. PATENT DOCUMENTS

| | | | |
|---|---|---|---|
| 6,510,243 B1* | 1/2003 | Ikeda | G06K 9/00442 358/462 |
| 9,083,933 B2 | 7/2015 | Sato et al. | |
| 2002/0188602 A1* | 12/2002 | Stubler | G06F 16/58 |
| 2013/0106915 A1* | 5/2013 | Lee | G06F 3/04883 345/672 |
| 2017/0069084 A1* | 3/2017 | Kubo | G06T 7/162 |

FOREIGN PATENT DOCUMENTS

| | | |
|---|---|---|
| JP | 2013-025748 | 2/2013 |
| JP | 2013-171373 | 9/2013 |

* cited by examiner

*Primary Examiner* — King Y Poon
*Assistant Examiner* — Michael Burleson
(74) *Attorney, Agent, or Firm* — JCIPRNET

(57) ABSTRACT

An information processing apparatus includes a display controller that displays on a display a drawing that expresses a meaning of target data, and an extracting unit that extracts partial data that is at least part of the target data, the partial data being used to express a specific portion if the specific portion is specified as part or whole of the drawing.

17 Claims, 23 Drawing Sheets

INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-079379 filed Apr. 17, 2018.

BACKGROUND

(i) Technical Field

The present invention relates to an information processing apparatus, and a non-transitory computer readable medium.

(ii) Related Art

Techniques are disclosed to output a summary of target data, such as documents, moving images, and voice data.

A drawing representing the meaning of target data, such as documents, moving images, and voice data may be produced and displayed. After the drawing representing the meaning of the target data is displayed, at least part of the target data may be desirably extracted.

SUMMARY

According to an aspect of the invention, there is provided an information processing apparatus. The information processing apparatus includes a display controller that displays on a display a drawing that expresses a meaning of target data, and an extracting unit that extracts partial data that is at least part of the target data, the partial data being used to express a specific portion if the specific portion is specified as part or whole of the drawing.

BRIEF DESCRIPTION OF THE DRAWINGS

Exemplary embodiments of the present invention will be described in detail based on the following figures, wherein.

DETAILED DESCRIPTION

Figure 1:
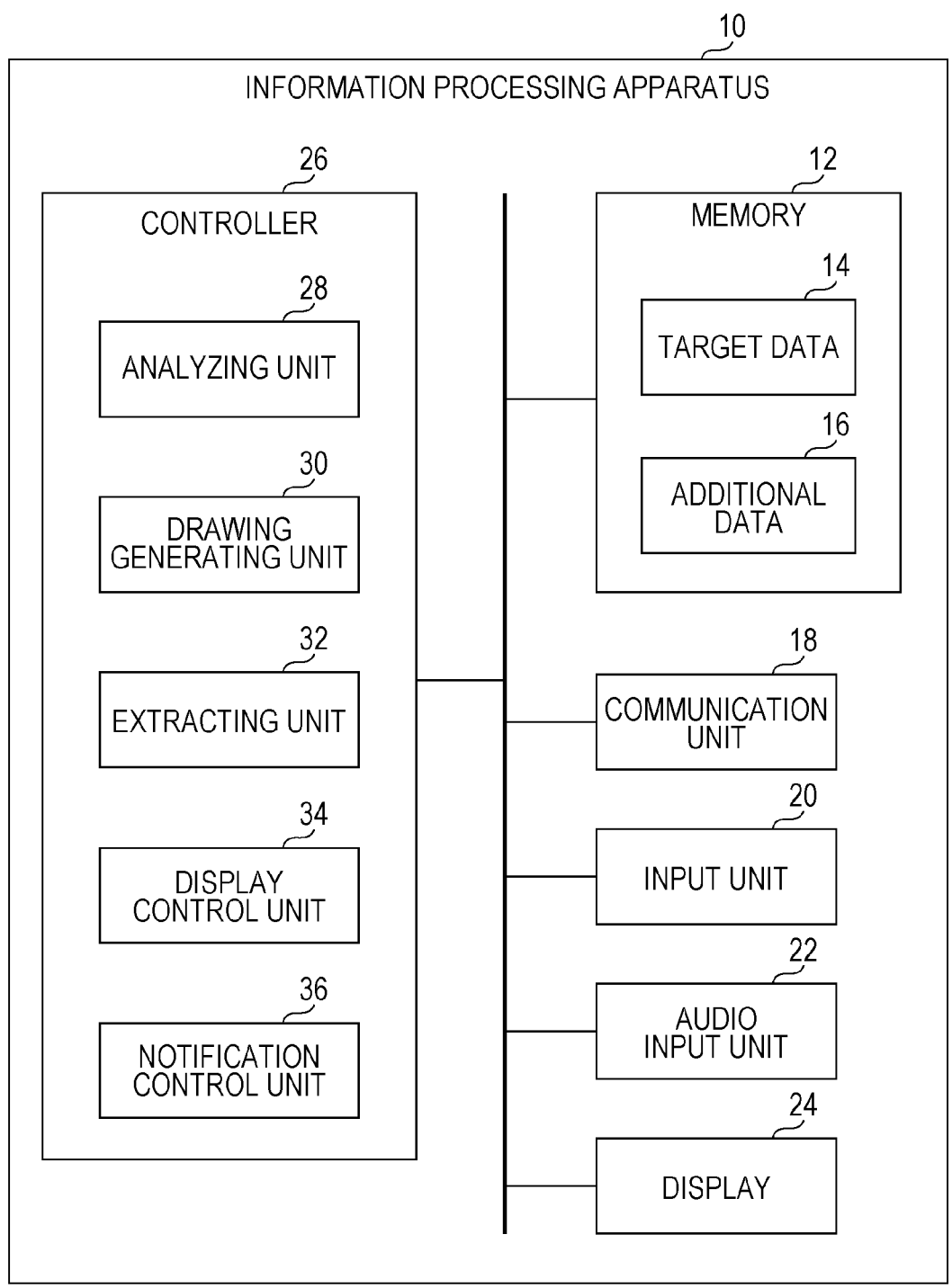
FIG. 1 illustrates a configuration of an information processing apparatus of an exemplary embodiment.

FIG. 1 illustrates a configuration of an information processing apparatus 10 of an exemplary embodiment. The information processing apparatus 10 may be a personal computer, a portable terminal such as a smart phone, or a server. The information processing apparatus 10 may be any device as long as the device has the functionalities described below.

The memory 12 includes a read-only memory (ROM), a random-access memory (RAM), and/or hard disk. The memory 12 stores an information processing program to cause each element in the information processing apparatus 10 to operate. Referring to FIG. 1, the memory 12 stores target data 14 and additional data 16.

The target data 14 is data serving as a process target of the information processing apparatus 10, and includes digital documents such as a web page or an electronic document, moving image data, or audio data. The target data 14 may be obtained from a device other than the information processing apparatus 10 via a communication unit 18 or may be produced by the information processing apparatus 10. The contents of the target data 14 includes but not limited to minutes of meetings.

Like the target data 14, the additional data 16 also includes digital documents, such as a web page and an electronic document, moving image data, or audio data. The additional data 16 is the data the information processing apparatus 10 acquires after a controller 26 has generated a drawing that expresses the meaning of the target data 14. If the target data 14 is minutes of a meeting for example, contents of the target data 16 may include inspection data input by a superior who have seen the minutes, and additional materials that were presented later by a participant or participants of the meeting. But the additional data 16 is not limited to these pieces of information.

The additional data 16 may be acquired from a device other than the information processing apparatus 10 via the communication unit 18, or may be produced by the information processing apparatus 10. The additional data 16 may or may not be identical to the target data 14 in a data format. For example, the target data 14 may be a moving image and the additional data 16 may be a still image. The additional data 16 may be stored in multiple memories 12.

The communication unit 18 may include a network adaptor. The communication unit 18 has a functionality that enables communications with another device via a communication network, such a local area network (LAN), and the Internet.

An input unit 20 includes a touch panel, a keyboard, and/or a mouse. The input unit 20 may include an interface that receives a contactless operation (gesture) using a camera or a sensor. The input unit 20 receives an instruction from a user to the information processing apparatus 10.

An audio input unit 22 may include a microphone, for example. The audio input unit 22 receives a voice instruction of the user to the information processing apparatus 10.

A display 24 includes a liquid-crystal panel. The display 24 displays a variety of screens, and in particular, displays process results of the controller 26.

If the information processing apparatus 10 is a server, the input unit 20, the audio input unit 22, and the display 24 may not necessarily be included therewithin. In such a case, the communication unit 18 receives a user's instruction or a voice instruction transmitted from a user terminal. The user terminal includes an input unit, such as a touchpanel, a keyboard, or a mouse, and an audio input unit, such as a microphone. The communication unit 18 has the functionalities of the input unit 20 and the audio input unit 22. The liquid-crystal panel of the user terminal has the functionality of the display 24.

The controller 26 includes a central processing unit (CPU) or a microcontroller, for example. The controller 26 controls each element of the information processing apparatus 10 in accordance with the information processing program stored on the memory 12. Referring to FIG. 1, the controller 26 has the functionalities of an analyzing unit 28, a drawing generating unit 30, an extracting unit 32, a display controller 34, and a notification controller 36.

The analyzing unit 28 acquires the meaning (contents) of the target data 14 by analyzing the target data 14. Similarly, the analyzing unit 28 acquires the meaning of the additional data 16 by analyzing the additional data 16. The process of the analyzing unit 28 is described with reference to the process performed on the target data 14. The analyzing unit 28 also performs on the additional data 16 a process similar to the process performed on the target data 14.

More specifically, the analyzing unit 28 acquires the meaning of the target data 14 by performing natural language processing on a character string extracted from the target data 14.

With respect to the extraction of a character string from the target data 14, if the target data 14 is an electronic document, the character string may be extracted by performing a character recognition process on the electronic document. If the target data 14 is moving image data or audio data, the character string may be extracted by converting an audio contained in the moving image data or the audio data into text data.

The natural language processing is processing including morphological analysis, syntactic analysis, semantic analysis and context analysis.

The morphological analysis is processing for decomposing a character string into multiple morphemes (minimum unit having a meaning in a language) in accordance with the syntax of a target language and information about word classes or the like, which is called a dictionary, and determining a word class of each morpheme.

The syntactic analysis is processing for determining a syntactic relationship such as a relationship among multiple morphemes (such as a modified and modifying relationship), and thus determining a positional relationship (modification) of the multiple morphemes. Via the syntactic analysis, syntax trees of multiple patterns (syntax tree having each morpheme as a node) are thus formed.

The semantic analysis is processing for determining a correct connection of the morphemes in accordance with the meaning of each morpheme, taking into consideration the meaning of each morpheme. Via the semantic analysis, a semantically correct syntax tree is selected from the syntax trees of multiple patterns.

The context analysis is processing for performing the syntax analysis and the semantic analysis across sentences composed of one or more morphemes. For example, via the context analysis, the contents of a demonstrative pronoun appearing in a second sentence is learned based on the contents of a first sentence.

The analyzing unit 28 desirably identifies one or more portions that are particularly of value in the target data 14 by performing the natural language processing on the target data 14. The analyzing unit 28 may not only identify a character string that expressly appears in the target data 14 may but also identify the contents containing the contents estimated from the contents of the character string as being of value.

The analyzing unit 28 may generate a summary character string representing a summary of the whole target data 14 by analyzing the meaning of the whole target data 14. The summary is the meaning (contents) that the target data 14 is intended to particularly express, and may be a duplication of a valuable portion of the target data 14. The summary character string may not necessarily have to be part of the character string extracted from the target data 14.

The analyzing unit 28 may divide the target data 14 into multiple segments in accordance with the meaning of the target data 14. For example, the target data 14 may be divided into four segments, namely, objective, problem, solution, and homework to be finished by next time.

The analyzing unit 28 may identify a portion of value on a per segment basis. The analyzing unit 28 may further generate the summary character string on a per segment basis.

The user may desirably set what segments the target data 14 is to be divided into.

Based on the meaning of the target data 14 acquired by the analyzing unit 28, the drawing generating unit 30 may generate a drawing that expresses at least part of the meaning of the target data 14. An example of the drawing may be the relationship between words contained in part of the target data 14 that has served as a generation target of the drawing, for example, the relationship of a subject (who), a verb (do), and an object (what). The drawing includes one or more elements. The elements may be a graphic, a photograph, or a character. For example, the drawing includes a combination of an element indicating a subject, an element indicating a verb, and an element indicating an object. The drawing is described in detail below.

The drawing generating unit 30 may generate a drawing that expresses the meaning of the portion that is part of the target data 14 and that is determined to be of value. The determination of the portion of value may be performed based on analysis results of the analyzing unit 28. The drawing generating unit 30 may generate the drawing that expresses the summary character string generated by the analyzing unit 28.

The drawing generating unit 30 may generate multiple drawings expressing the meanings of multiple portions of the target data 14. For example, as described above, if the analyzing unit 28 divides the target data 14 into multiple segments, the drawing generating unit 30 may generate a drawing of multiple drawing segments respectively representing multiple segments of the target data 14. Alternatively, the drawing generating unit 30 may generate a single drawing expressing a single segment among plural segments.

If the additional data 16 is specified by the user for the target data 14 after the drawing expressing the target data 14 is generated, the drawing generating unit 30 re-generates the drawing considering not only the meaning of the target data 14 but also the meaning of the additional data 16.

If a specific portion is specified by the user for the drawing generated by the drawing generating unit 30 and expressing the target data 14, the extracting unit 32 extracts as partial data at least part of the target data 14 that has been used to express the specific portion. The specific portion may be part or whole of the drawing, and the partial data may be the whole of the target data 14. The partial data extracted is stored on the memory 12 or transmitted to another device via the communication unit 18.

When the extracting unit 32 extracts the partial data from the target data 14, the drawing generating unit 30 may re-generate a drawing that expresses a remaining portion of the target data 14 equal to the target data 14 without the partial data. If the partial data is extracted, the drawing generating unit 30 may leave the generated drawing as it is (in other words, does not re-generate the drawing).

The display controller 34 performs an operation to display a variety of screens on the display 24. In particular, the display controller 34 displays on the display 24 the drawing generated (or re-generated) by the drawing generating unit 30, the additional data 16, or the partial data extracted by the extracting unit 32.

If the additional data 16 is specified for the target data 14 and the drawing is re-generated in view of the additional data 16, and if an object expressed by the drawing and appearing (contained in the drawing) in the target data 14 is affected in view of the additional data 16, the notification controller 36 outputs a notification about the appearing object. Also, if the partial data is extracted from the target data 14 and the drawing is re-generated, and if an object expressed by the drawing and appearing in the target data 14 is affected in meaning as the partial data is removed, the notification controller 36 outputs a notification about the appearing object.

The appearing object includes but not limited to a person. For example, the appearing object includes an artificial intelligence (AI) robot or a variety of devices (such as a device that gives an animal food or medicine). If the appearing object is a person, the notification controller 36 outputs the notification by sending a mail to the person. If the appearing object is an AI robot, the notification controller 36 outputs the notification by transmitting a signal for control.

The process of the drawing generating unit 30, the extracting unit 32, the display controller 34, and the notification controller 36 is described in detail below.

Figure 2:
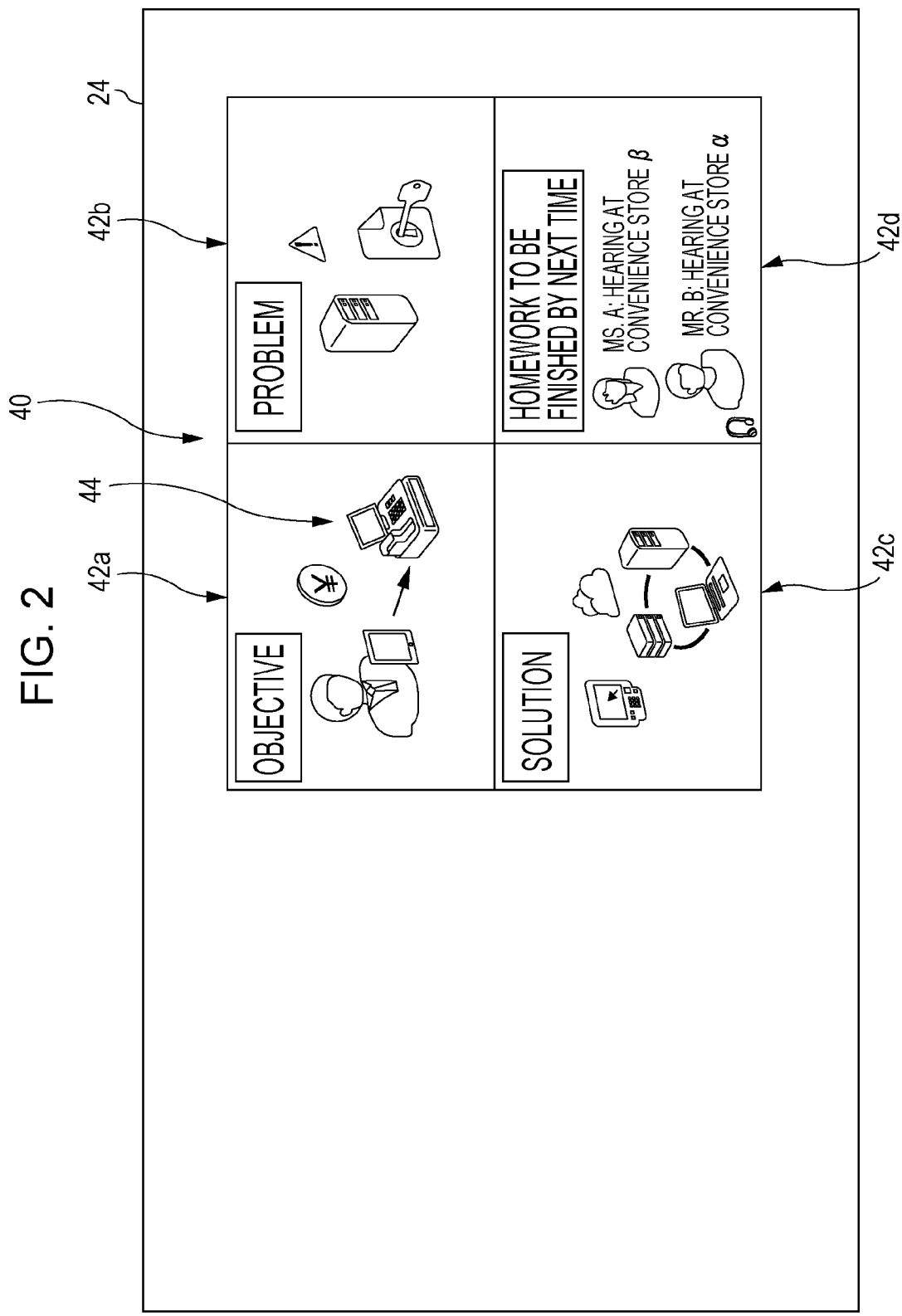
FIG. 2 is a display example of a drawing illustrating the meaning of target data.

The drawing generated by the drawing generating unit 30 is described in detail. Referring to FIG. 2, a drawing 40 generated by the drawing generating unit 30 and expressing the target data 14 is displayed on the display 24.

In the exemplary embodiment as illustrated in FIG. 2, the drawing 40 includes multiple drawing segments 42a through 42d (the multiple drawing segments 42a through 42d are hereinafter collectively referred to as drawing segments 42) responsive to the meaning segments of the target data 14. The drawing 40 may be a single drawing that expresses a single segment (portion).

Referring to FIG. 2, the analyzing unit 28 divides the target data 14 into four segments, namely, objective, problem, solution, and homework to be finished by the next time. The drawing generating unit 30 generates a drawing segment 42a for the objective, a drawing segment 42b for the problem, a drawing segment 42c for the solution, and a drawing segment 42d for the homework to be finished by the next time. The display controller 34 displays the drawing 40 includes the drawing segments 42 on the display 24.

The drawing segments 42 corresponding to the segments of the target data 14 may be expressions of the summary character strings of the segments generated by the analyzing unit 28. For example, the drawing segment 42a expresses the summary character string of the objective in the target data 14, the drawing segment 42b expresses the summary character string of the problem in the target data 14, the drawing segment 42c is the summary character string of the solution in the target data 14, and the drawing segment 42d is the summary character string of the homework to be finished by the next time in the target data 14.

The drawing segment 42 corresponding to the segment may express a portion of each of the segments of the target data 14 (for example, a portion of value).

The segments are not limited to the objective, the problem, the solution, and the homework to be finished by the next time. The multiple segments may include units of a logical flow of, for example, a beginning sentence, a succeeding sentence to the beginning sentence, a changing sentence from a different angle of the logic, and a conclusive sentence in that order. Alternatively, the segments may include ones responsive to the contents of the target data 14, such as a device, communications, and persons.

In accordance with the exemplary embodiment, the drawing 40 (the drawing segment 42) includes one or more elements 44. The element 44 expresses at least part of the meaning of each segment. In the drawing segment 42a corresponding to the object segment of FIG. 2, the elements 44 include a graphic representing a male, a graphic representing a smart phone, a graphic representing money, and a graphic representing a cash register. These elements 44 represent an "electronic payment action". In order to clearly indicate the electronic payment action with a smart phone, the drawing segment 42a includes an element 44 indicating an arrow mark pointing from the graphic representing the smart phone to the graphic representing the cash register.

The elements 44 in the drawing 40 are not limited to graphics, but may include a photograph and characters. For example, in the drawing segment 42d of FIG. 2, a character element reading "Ms. A: Hearing at convenience store β" is included in the elements 44.

The display controller 34 may determine the display form of the elements 44, based on the degree of importance of a word expressed by the element 44 contained in the drawing 40 in the target data 14. For example, based on the process results of the analyzing unit 28, the element 44 expressing the word that is determined to be of more importance is displayed in a larger size. The degree of importance of the elements 44 may be expressed in a form different from the size thereof. For example, the degree of importance may be expressed by the color of the element 44 or may be expressed by the font of the element 44 if the element is characters.

Figure 3:
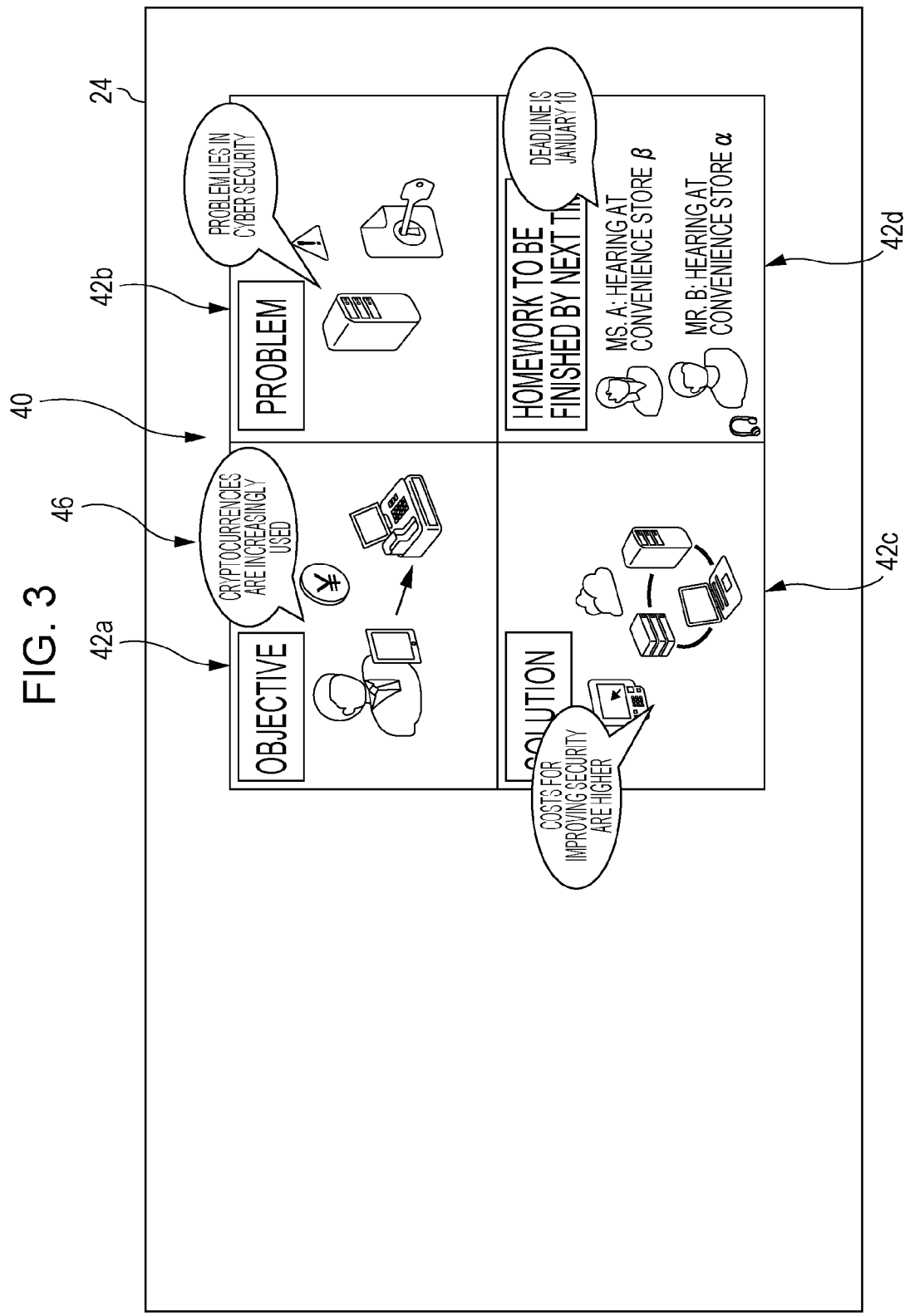
FIG. 3 is a display example of a drawing including an expression of additional information.

The drawing generating unit 30 may generate the drawing 40 containing the expression of the additional information in view of the additional information not contained in the target data 14. FIG. 3 illustrates an example of the drawing 40 containing an expression 46 of the additional information and displayed on the display 24. In the example of FIG. 3, the drawing segments 42 respectively contain the expressions 46 of the additional information.

In accordance with the exemplary embodiment, the user adds the additional information. More specifically, after the drawing 40 is displayed, the user adds the additional information for the displayed drawing 40, using the input unit 20. In the example of FIG. 3, the user's comment for each drawing segment 42 is the additional information for each of the drawing segments 42 (each segment of the target data 14), and the balloon containing the character string corresponding to the user's input comment is the expression 46 of the additional information. The additional information may be added using another method. The contents of the additional information may be anything other than the contents that are input by the user.

The user may specify the additional data 16 after the drawing generating unit 30 generates the drawing expressing the target data 14. The process of re-generating the drawing in this case is described in detail below.

Figure 4:
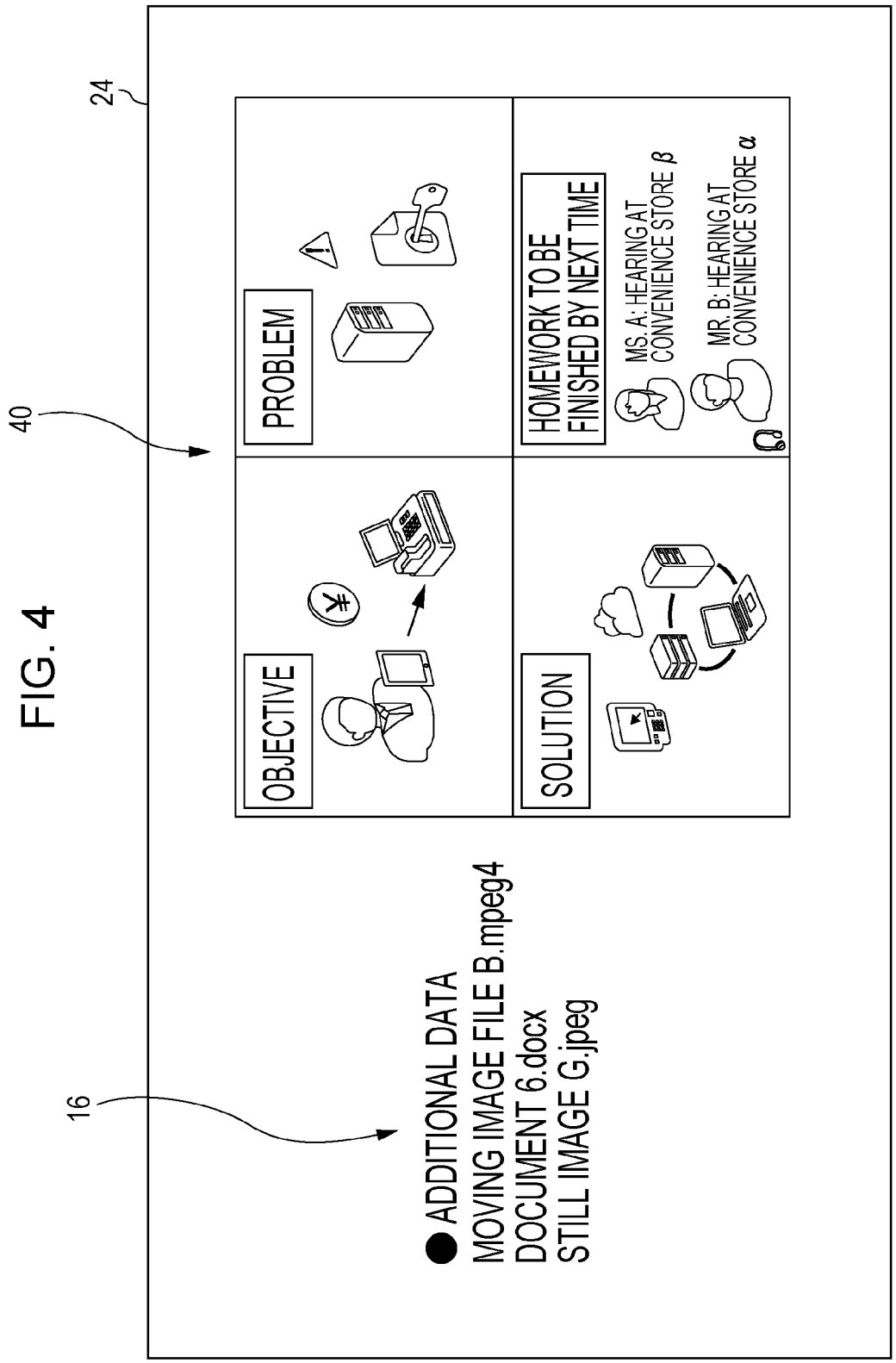
FIG. 4 illustrates a display example of a drawing and additional data.

A method of specifying the additional data 16 for the target data 14 is described below. In accordance with the exemplary embodiment, as illustrated in FIG. 4, the display controller 34 displays the additional data 16 outside a display region of the drawing 40, together with the drawing 40 expressing the target data 14 (prior to considering the additional data 16). In the example of FIG. 4, multiple pieces of the additional data 16 (moving image files B.mpeg4, document 6.docx, and still image G.jpeg) are displayed. The additional data 16 may be expressed in a variety of data formats. For example, even in a case where the target data 14 is a moving image, a still image or an electronic document may be specified as additional data. As described above, the target data 14 may be different from the additional data 16 in terms of data format.

Figure 5:
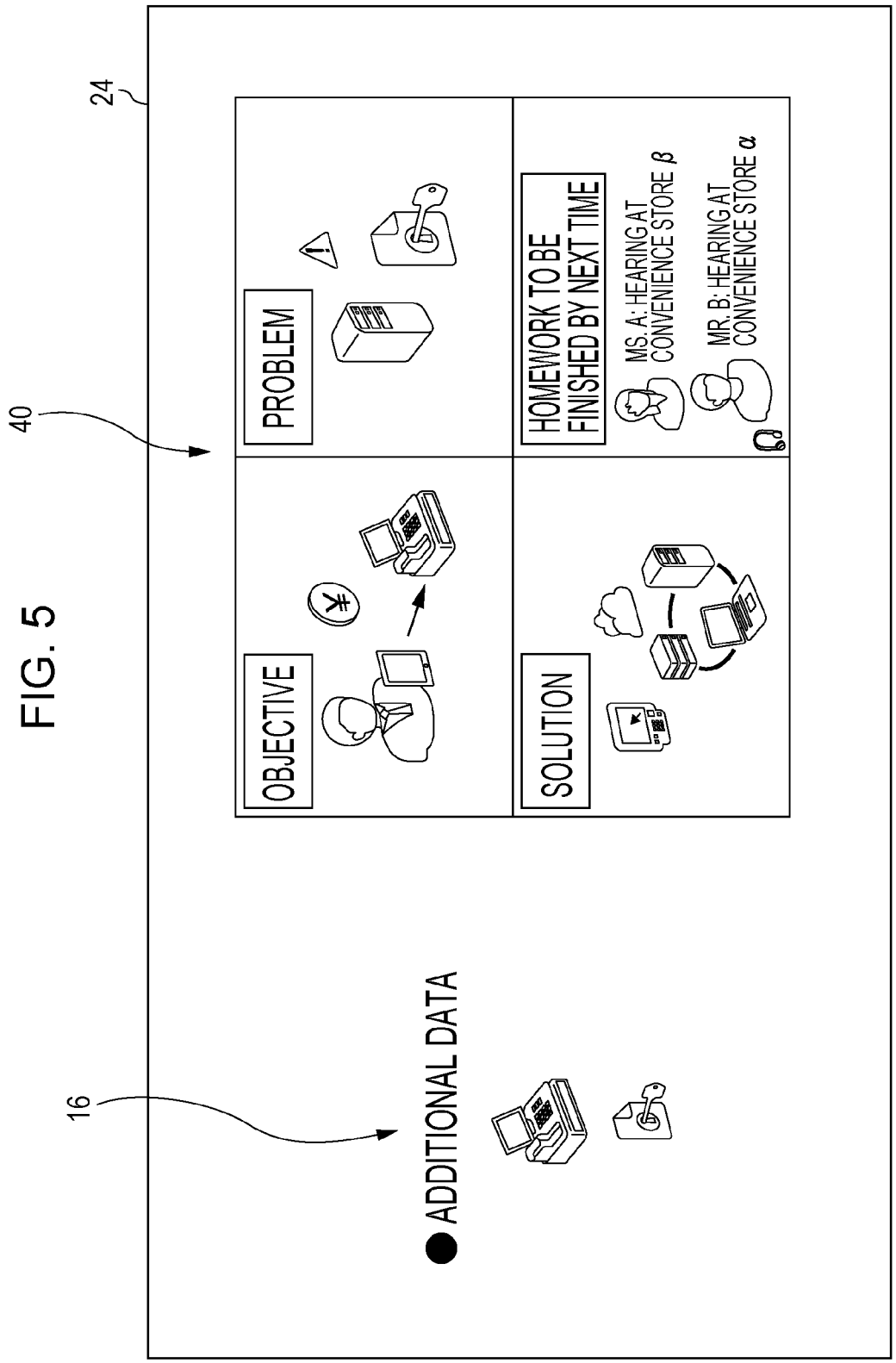
FIG. 5 illustrates an example of the additional data displayed in an image form.

Referring to FIG. 4, the additional data 16 is displayed in character strings. The display controller 34 may display the additional data 16 in images as illustrated in FIG. 5. For example, if the additional data 16 is a moving image, the display controller 34 may display one frame of the moving image. If the additional data 16 is a still image, the display 24 may display part of the still image or the still image in a reduced scale. The drawing generating unit 30 may generate an image representing the meaning of the additional data 16, and the display controller 34 may display that image.

Figure 6:
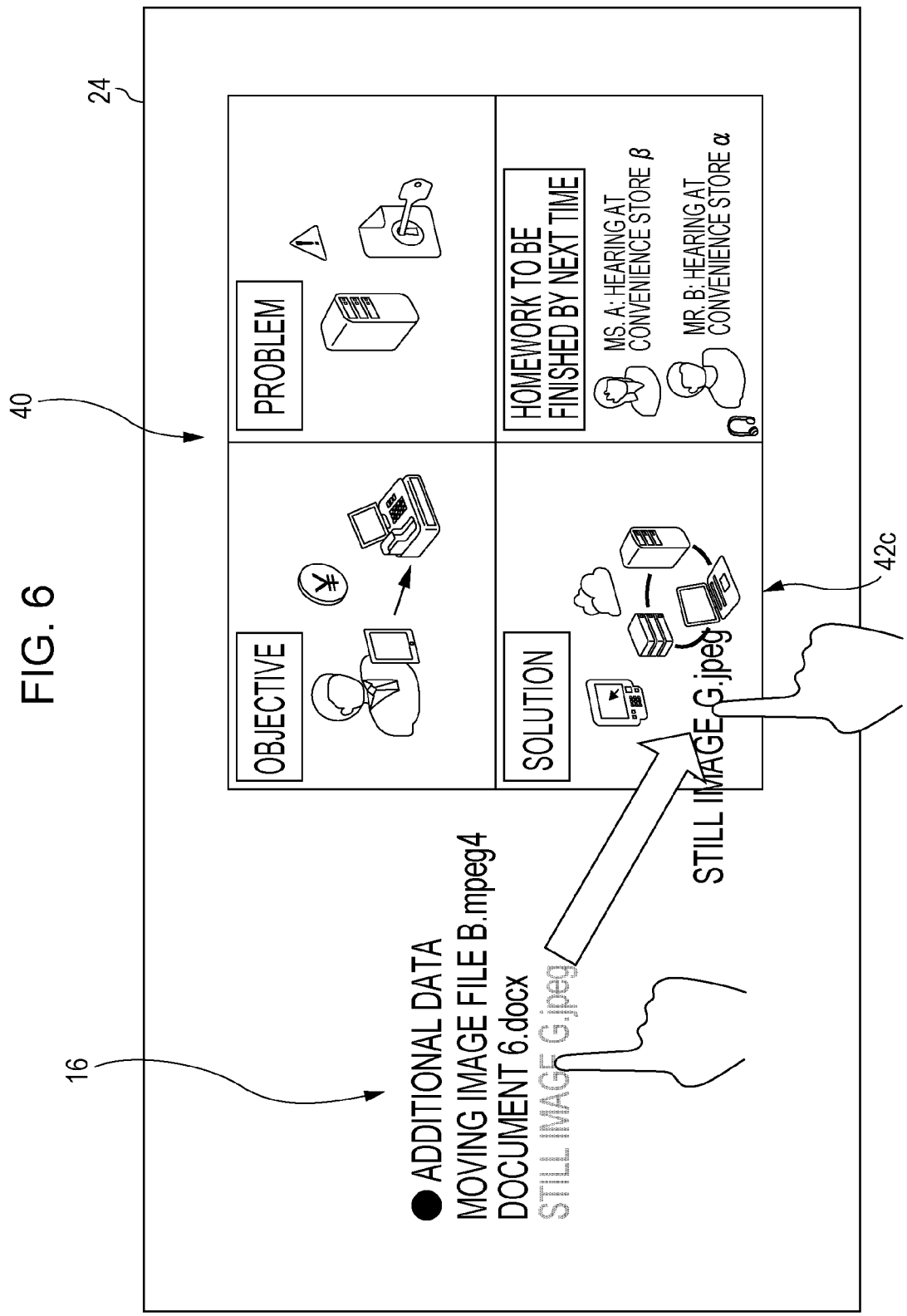
FIG. 6 illustrates how the additional data is specified for the target data.

The user may specify the additional data 16 for the target data 14 corresponding to the drawing 40 by moving, on the display 24, the additional data 16 from outside the display region of the drawing 40 into the display region thereof. FIG. 6 illustrates how the additional data 16 is moved from outside the display region of the drawing 40 into the display region thereof. The additional data 16 may be moved by touching the additional data 16 with a finger or a stylus on a touch panel, and moves the additional data 16 with the finger or the stylus remaining in touch therewith into the display region of the drawing 40 (namely, in a sliding operation). Alternatively, using the mouse, a button of the mouse is pressed with a pointer placed on the additional data 16 to be moved, and the pointer is moved into the display region of the drawing 40 with the button remaining pressed (namely, in a drag operation). The additional data 16 may also be moved into the display region of the drawing 40 using another method.

If multiple pieces of the additional data 16 are displayed, the additional data 16 is moved into the display region of the drawing 40 on an individual basis. If the multiple pieces of the additional data 16 are displayed, the user may thus specify one piece of the additional data 16 selected from the multiple pieces of the additional data 16.

If the drawing 40 includes multiple drawing segments 42, a segment of the target data 14 may be specified by the destination of the additional data 16, and then additional data 16 is specified. In the example of FIG. 6, the still image G.jpeg as the additional data 16 is moved into the display region of the drawing segment 42c. In this way, the segment of the solution corresponding to the drawing segment 42c is specified and then the additional data 16 is specified.

The additional data 16 may be specified for the target data 14 using a method different from the ones described above. For example, the display controller 34 may display a selection screen on the display 24 where the additional data 16 is selected for the target data 14, and the user may specify the additional data 16 on the selection screen. In such a case, as well, the additional data 16 is desirably specified with the specific segment specified. Alternatively, the additional data 16 may be specified by inputting in the audio input unit 22 a voice instruction to specify the additional data 16 for the target data 14.

Figure 7:
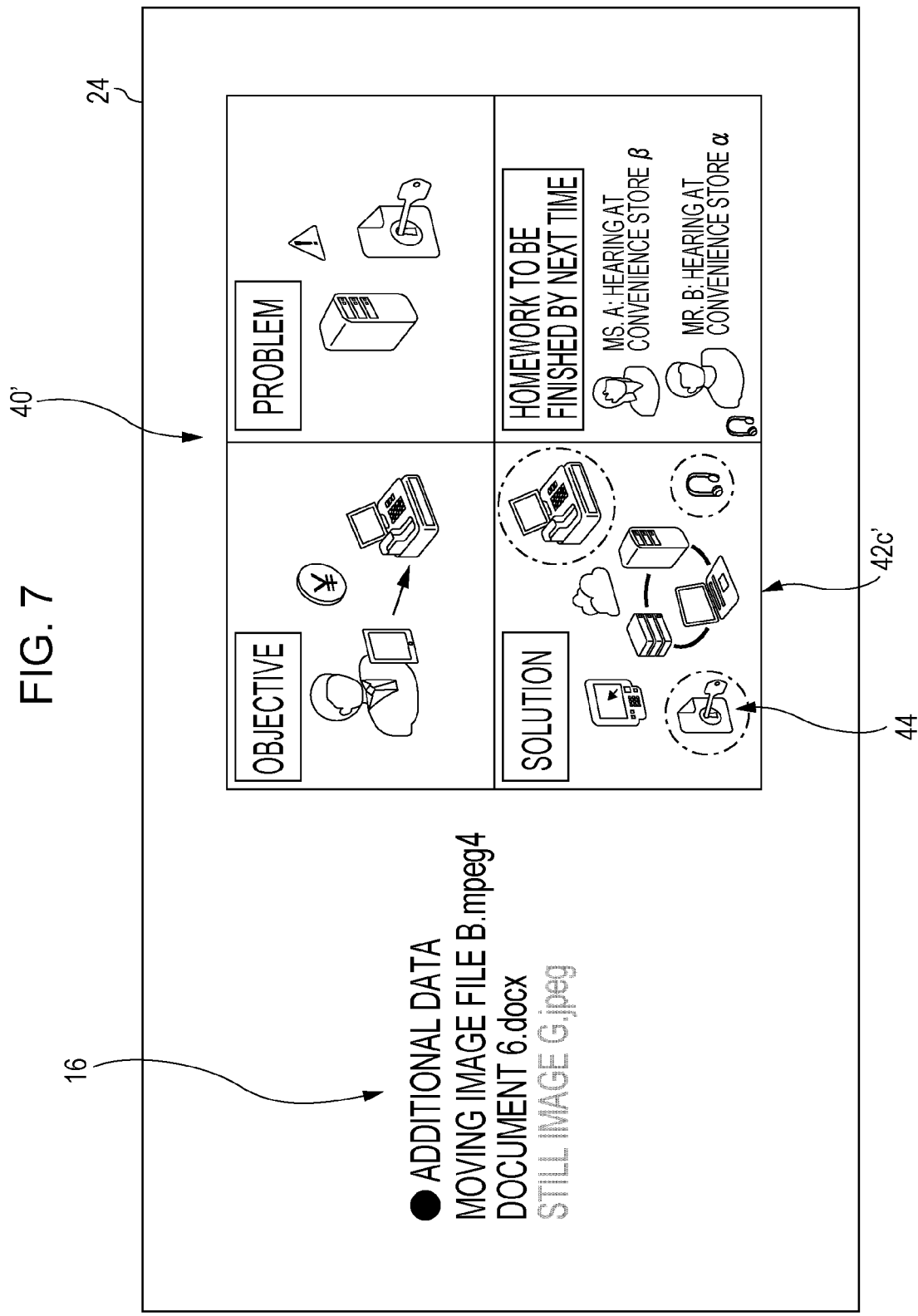
FIG. 7 illustrates a display example of a drawing that is re-generated in view of the additional data.

When the additional data 16 is specified for the target data 14, the drawing generating unit 30 re-generates the drawing in view of the specified additional data 16. The display controller 34 causes a drawing 40' re-generated by the drawing generating unit 30 to be displayed on the display 24. FIG. 7 illustrates an example of the re-generated drawing 40'. The drawing 40' additionally includes some elements 44 (each element 44 surrounded in a dot-dash line circle in FIG. 7) in comparison with the drawing 40 prior to accounting for the additional data 16. The re-generated drawing 40' accounts for the additional data 16, but the contents of the re-generated drawing 40' may not necessarily have to be different from the drawing 40 before the additional data 16 is accounted for. Depending on the contents of the additional data 16, the drawing 40 may be identical to the drawing 40' in content.

The drawing 40' of FIG. 7 is re-generated when the additional data 16 is specified with the solution as the specific segment specified as illustrated in FIG. 6. If the additional data 16 is specified for the target data 14 with the specific segment specified, the drawing generating unit 30 re-generates a drawing segment 42c' expressing the specific segment (the solution in FIG. 7) in view of the additional data 16. (Hereinafter the drawing segments re-generated by specifying the additional data 16 are collectively referred to as drawing segments 42'). For example, the drawing segment 42c' expresses the contents of the solution as a specific segment of the target data 14 and the contents of the additional data 16. The drawing segment 42a, the drawing segment 42b, and the drawing segment 42c other than the specific segment may not necessarily have to be a drawing re-generation target.

If the contents of the additional data 16 are added to the contents of the specific segment of the target data 14, the contents of another segment may be affected. For example, if the contents of the additional data 16 are added to the contents of the solution as the specific segment, the contents of the homework to be finished by the next time as another segment may be affected. If the contents of the additional data 16 are added to the contents of the problem as the specific segment, the solution or the homework to be finished by the next time as other segments may be affected.

When the additional data 16 is specified for the target data 14 with the specific segment specified, the drawing generating unit 30 may set, as re-generation targets, not only the drawing segment 42c corresponding to the specific segment but also the drawing segments 42a, 42b, and 42d with the contents thereof varying in response to the additional data 16 added to the specific segment.

Figure 8:
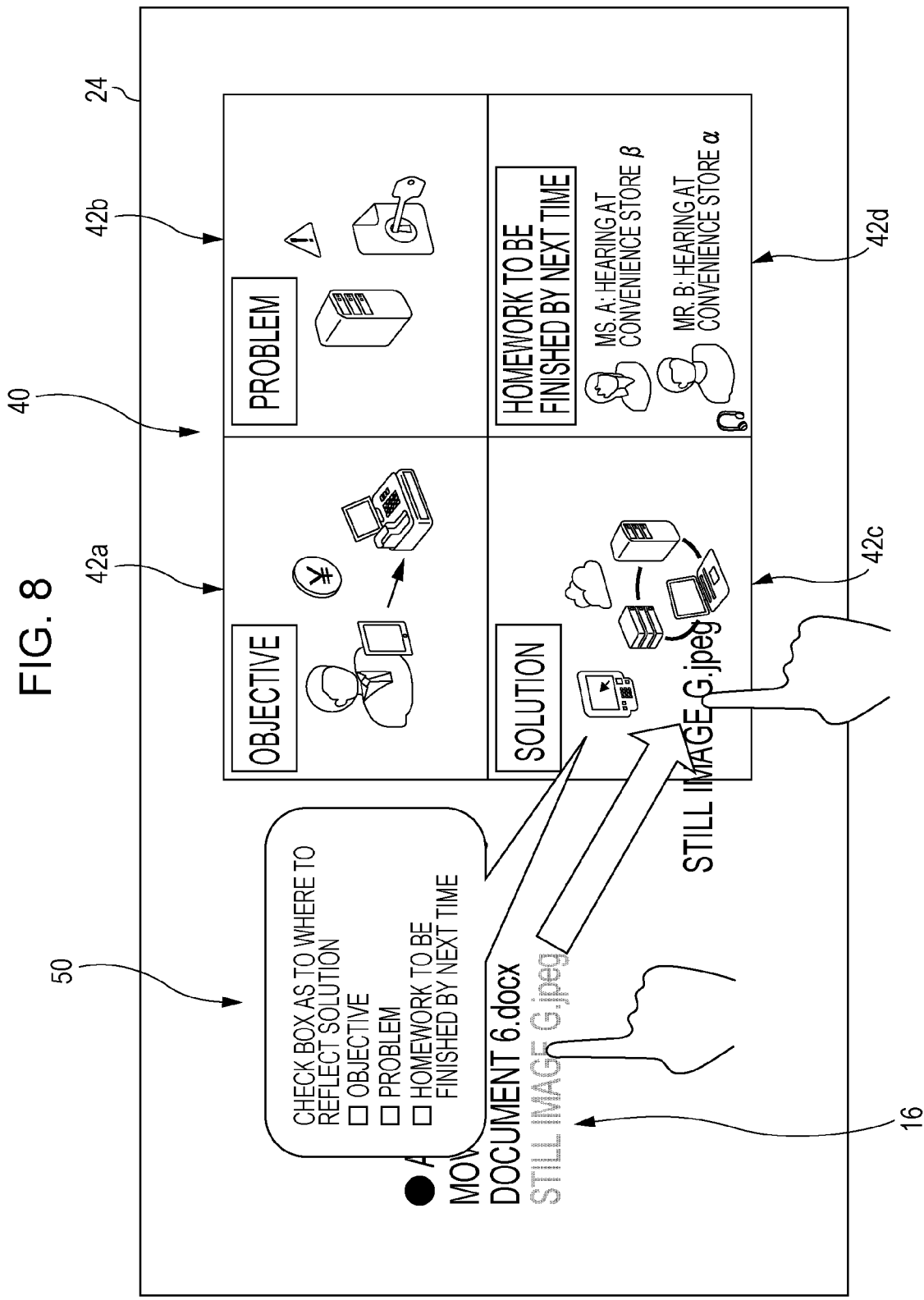
FIG. 8 illustrates an example of a screen that is displayed when the additional data is specified and that specifies a segment to re-generate the drawing.

The user may select another segment that serves as a drawing re-generation target when the additional data 16 is specified. When the additional data 16 is specified with the specific segment specified as illustrated in FIG. 8 in accordance with the exemplary embodiment, the display controller 34 displays another segment selection window 50 that allows the user to select another segment that serves as a drawing re-generation target. When the user selects another segment that serves as a drawing re-generation target, the drawing generating unit 30 re-generates the drawing segment 42c' as the specific segment and another drawing segments 42' as another selected segment.

Figure 9:
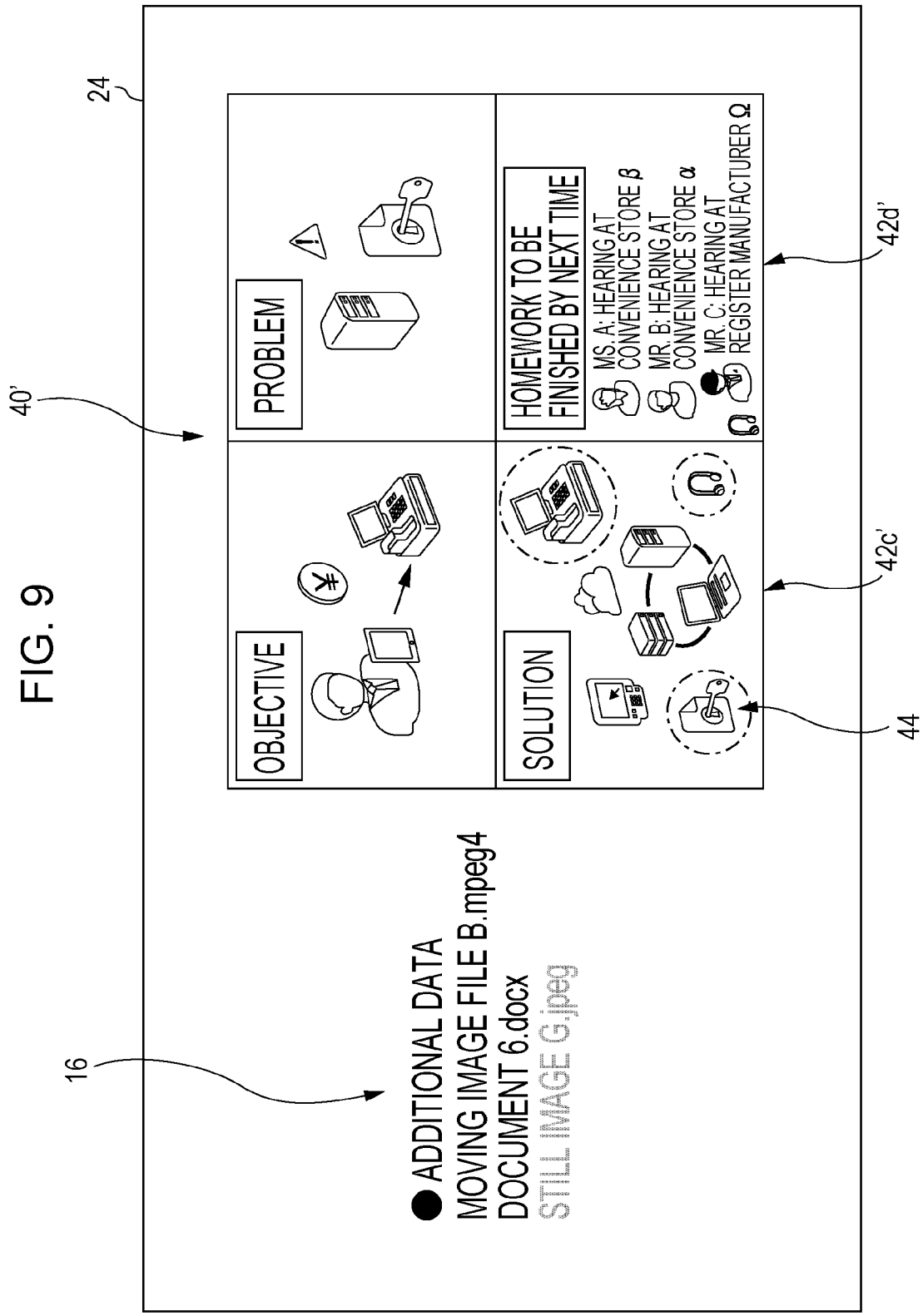
FIG. 9 illustrates an example of a drawing segment that is re-generated in response to the meaning of another segment that has been changed as a result of adding additional data onto the specified segment.

Referring to FIG. 9, the homework to be finished by the next time as another segment is selected in another segment selection window 50, and the additional data 16 is specified with the solution serving as the specific segment. The drawing segment 42c' responsive to the solution as the specific segment and the drawing segment 42d' responsive to the homework to be finished by the next time as another segment are re-generated and displayed. In the re-generated drawing segment 42d', the contents of the solution have changed, and the homework to be finished by the next time is newly displayed indicating that Mr. C is to hear from register manufacturer Ω.

When the additional data 16 is specified for the target data 14, Mr. C who appears in the target data 14 is affected in meaning as indicated by the drawing segment 42d'. The notification controller 36 thus sends a notification to Mr. C (via a mail, for example). In this way, Mr. C may easily learn that his own homework to be finished by the next time is modified by the additional data 16.

When the additional data 16 is specified, another segment that serves as a drawing re-generation target may be automatically determined instead of being selected by the user. More specifically, the drawing generating unit 30 automatically selects the drawing of another segment as a re-generation target with the meaning of the other segment changing in concert with a change in the meaning of the specific segment, and re-generates a drawing that expresses the changed meaning of the other selected segment.

The other segment with the meaning thereof changing in concert with a change in the meaning of the specific segment may be a segment having a meaning of subordinate concept when the specific segment has a meaning of superordinate concept, or a segment having a downstream meaning when the specific segment has an upstream meaning. If the target data 14 is data representing a series of steps, the other segment may be a segment having a meaning related to a subsequent step when the specific segment has a meaning related to a preceding step.

In the example of the exemplary embodiment (including the four segments of the objective, the problem, the solution, and the homework to be finished by the next time), the changing of the problem typically leads to the changing of the solution and the homework to be finished by the next time. If the additional data 16 is specified with the problem specified to be the specific segment, the drawing generating unit 30 may automatically select not only the problem but also the homework to be finished by the next time as drawing re-generation targets.

When the additional data 16 is specified, the user may determine whether to set the drawing re-generation target to be only one segment of the drawing segments 42 or to further include another segment of the drawing segments 42.

Figure 10:
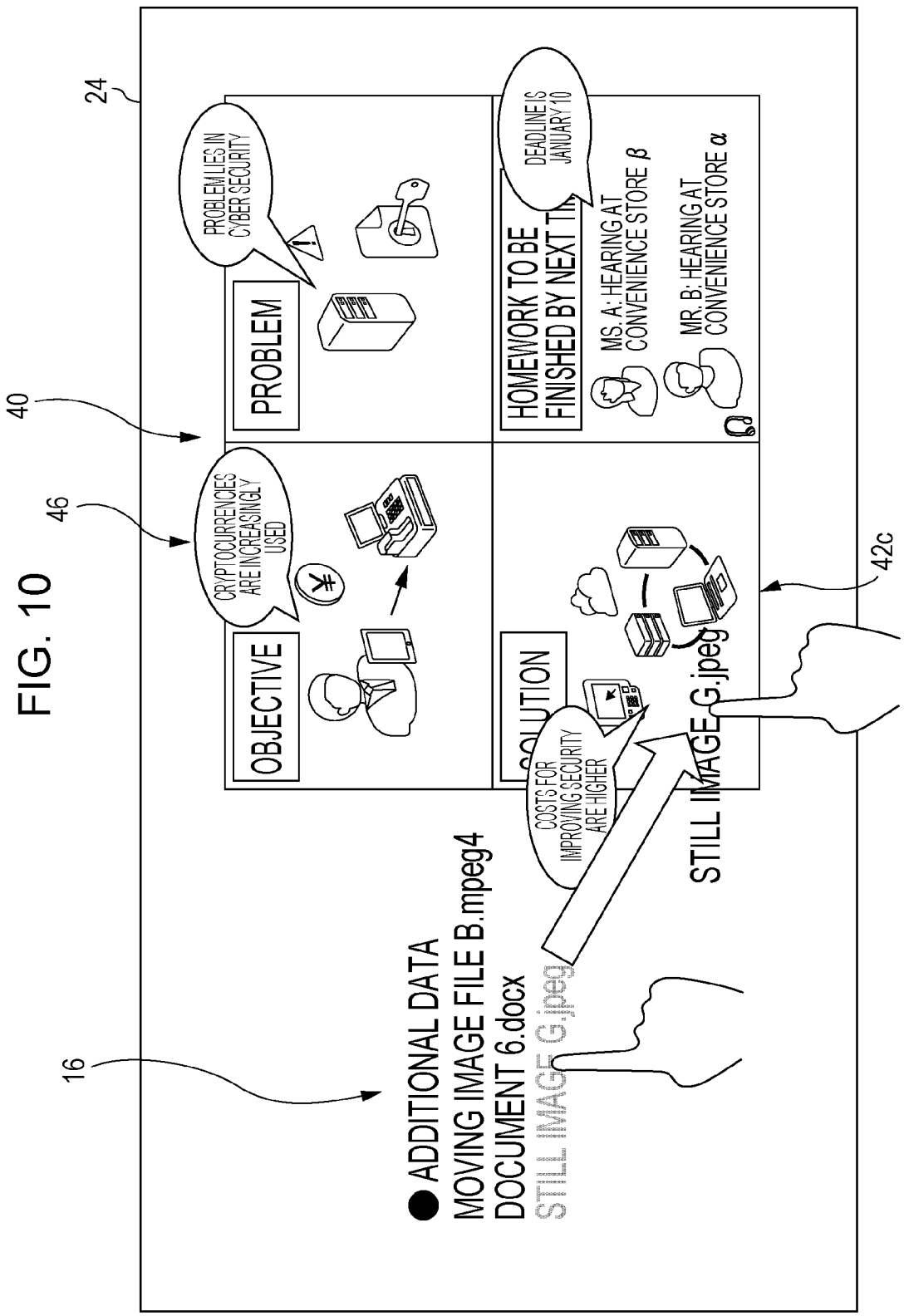
FIG. 10 illustrates how the additional data is specified for the drawing including an expression of the additional information.

As described above, the drawing generating unit 30 may generate the drawing 40 including the expression 46 as the additional information. If the additional data 16 is specified for the drawing 40 including the expression 46 of the additional information as illustrated in FIG. 10, the drawing generating unit 30 sets the drawing 40 to be a re-generation target. In such a case, the additional information has a meaning that is not included in the target data 14, the handling of the expression 46 of the additional information in the re-generated drawing 40' may be problematic.

Figure 11:
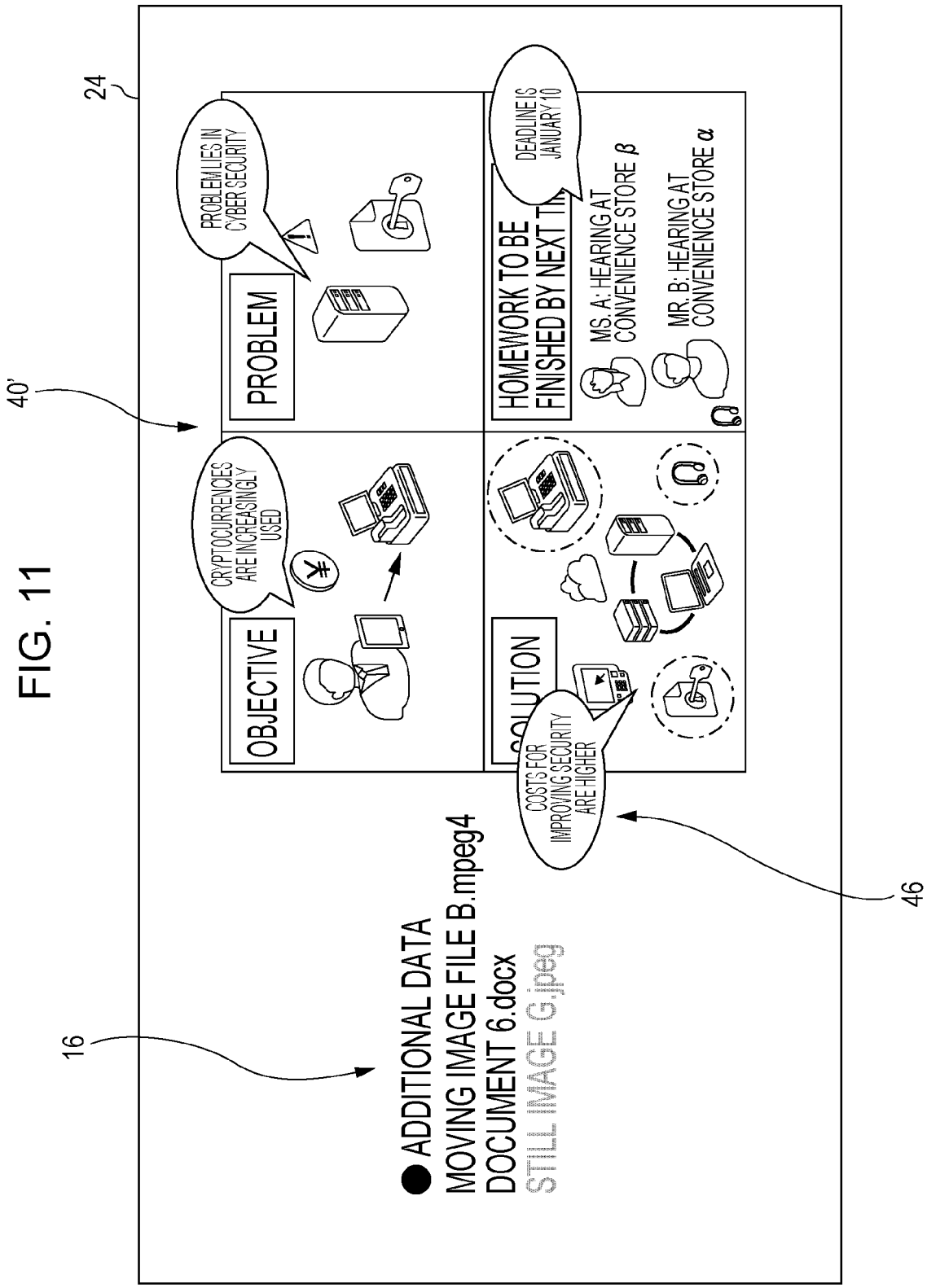
FIG. 11 illustrates a display example of the drawing that is re-generated without modifying the expression of the additional information.

FIG. 11 illustrates a first display example of the drawing 40' that has been re-generated when the additional data 16 is specified with the specific segment specified in the drawing 40 including the expression 46 of the additional information. By comparison of FIG. 10 with FIG. 11, the drawing generating unit 30 re-generates the drawing 40' without modifying the expression 46 of the additional information contained in the drawing 40 before the additional data 16 is specified.

Figure 12:
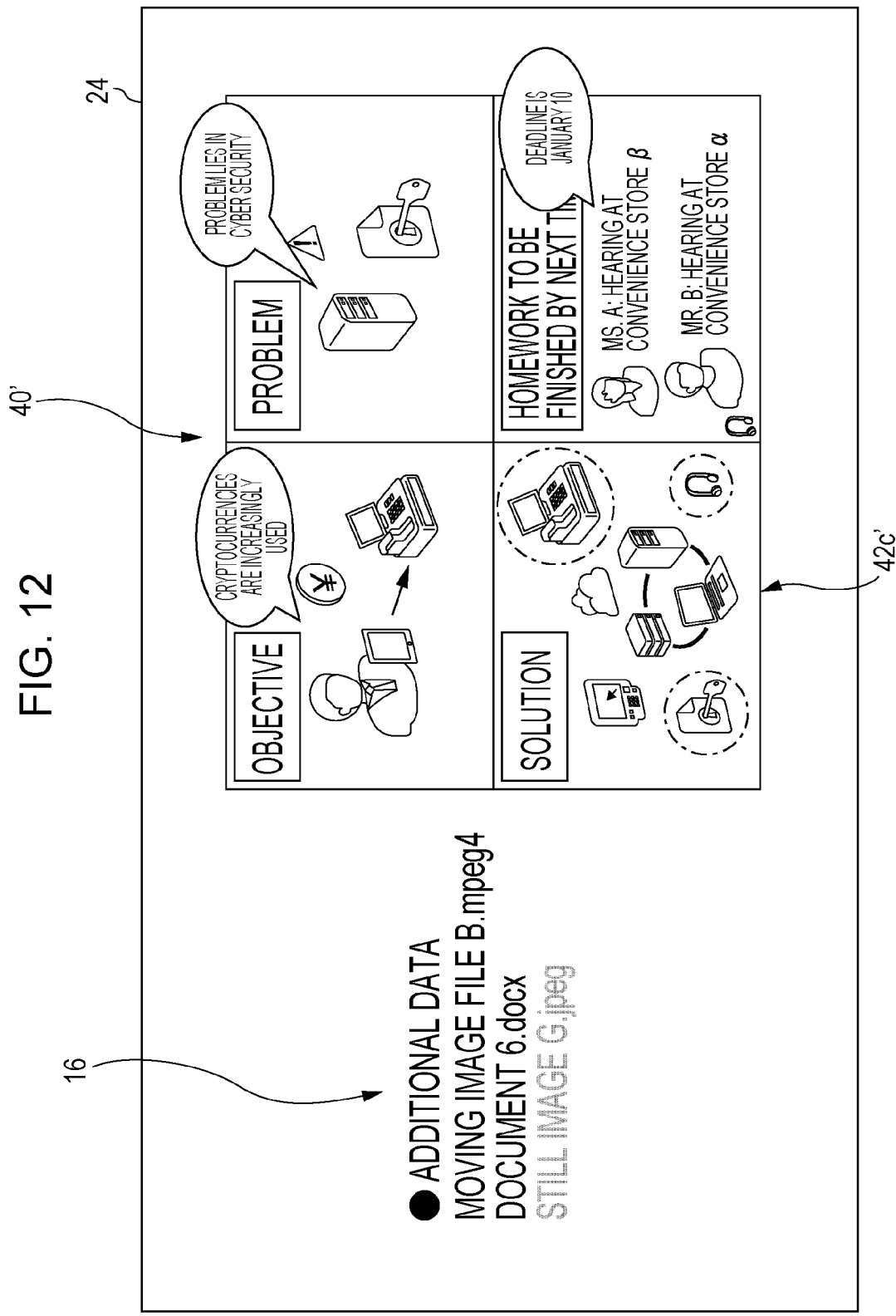
FIG. 12 illustrates a display example of the re-generated drawing that does not include the expression of the additional information.

FIG. 12 illustrates a second display example of the drawing 40' that has been re-generated by specifying the additional data 16 with the specific segment specified, in the drawing 40 with the expression 46 of the additional information included. Referring to FIG. 12, the drawing generating unit 30 may re-generate the drawing 40' that does not include the expression 46 of the additional information that the drawing 40 has before the additional data 16 is specified. Since the solution is specified to be the specific segment in the example of FIG. 12, only the drawing segment 42c' related to the specific segment is re-generated. In the drawing segment 42c', the expression 46 of the additional information that the drawing segment 42c has is deleted. This controls an inconsistency between the expression contents of the drawing segment 42c' and the contents of the expression 46 of the additional information attached to the drawing segment 42c'.

When the drawing 40' that is re-generated by specifying the additional data 16 for the drawing 40 containing the expression 46 of the additional information is displayed, the display controller 34 may display on the display 24 a screen prompting the user to edit the additional information. FIG.

Figure 13:
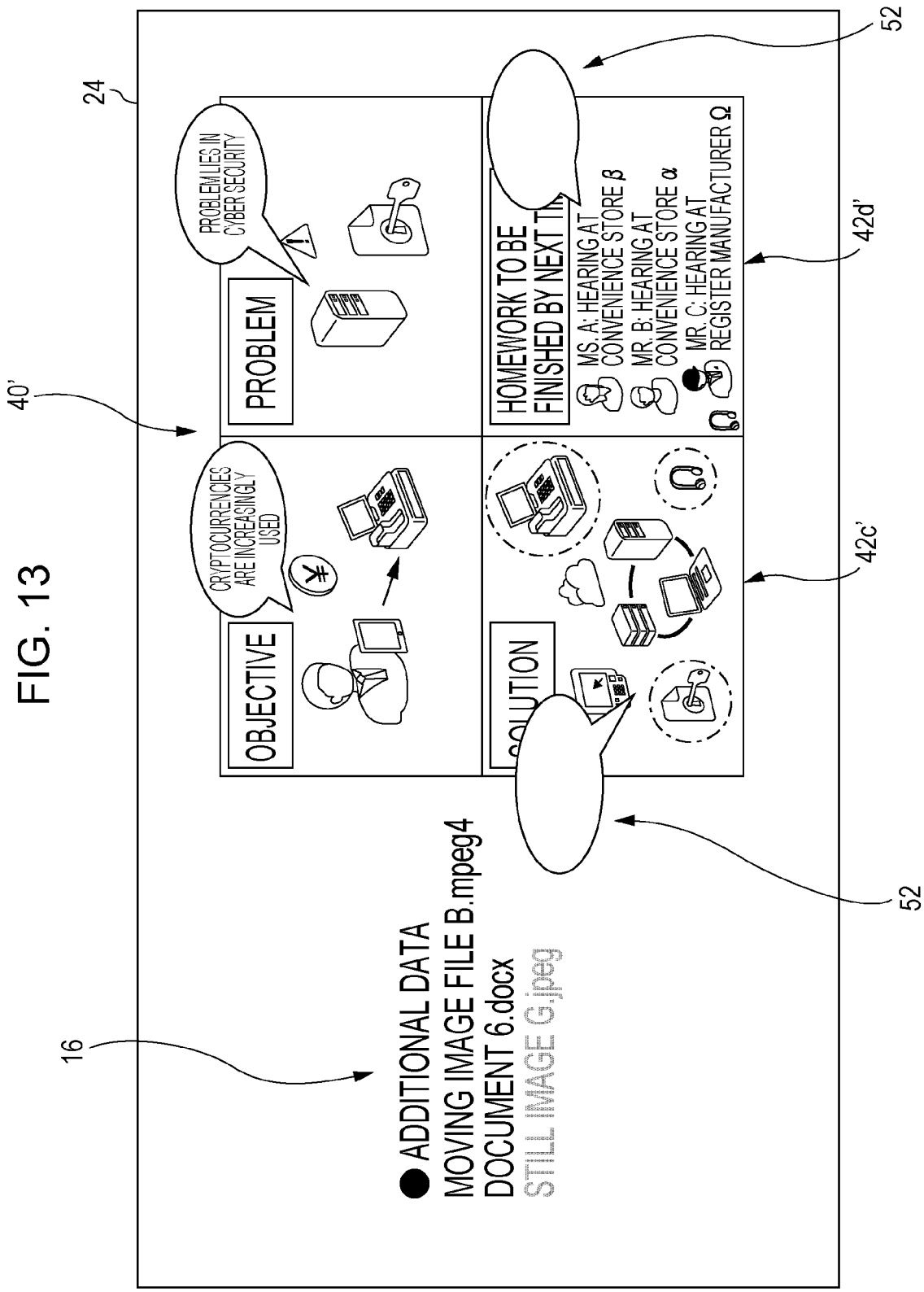
FIG. 13 illustrates an example of an edit screen of the additional information which is displayed when the additional data is added to the target data.

13 illustrates a display example of the screen prompting the user to edit the additional information. In the example of FIG. 13, the solution is specified as the specific segment, and in response to this, the drawing segment 42c' of the solution as the specific segment and the drawing segment 42d' as the homework to be finished by the next time as another segment are re-generated. In the re-generated drawing segment 42c', the display controller 34 deletes the expression 46 of the additional information included in the drawing segment 42c, and newly displays to the user a comment entry column 52 that receives additional information (a comment herein) for the drawing segment 42c'. Similarly, in the re-generated drawing segment 42d', the display controller 34 deletes the expression 46 of the additional information contained in the drawing segment 42d, and newly displays to the user a comment entry column 52 that receives additional information for the drawing segment 42d'.

The screen prompting the user to edit the additional information may be a screen other than the screen of FIG. 13. Before displaying to the user the screen prompting the user to edit the additional information, a confirmation screen having a message reading "Do you edit the comment because the drawing is re-generated?" may be displayed, and then the screen prompting the user to edit the additional information may be displayed after the user has confirmed.

In the example of FIG. 13, the additional information for the drawing segment 42c' and the additional information for the drawing segment 42d' are concurrently editable. If multiple drawing segments 42' are re-generated, edit screens of the additional information for the drawing segments 42' are successively displayed in order to allow the user to successively edit multiple pieces of the additional information for the drawing segments 42'. In this case, the display order of the edit screens for the additional information is desirably determined in accordance with the relationship of the segments of the target data 14 responsive to the re-generated drawing segments 42'. For example, if the target data 14 is written in the units of a logical flow of, for example, a beginning sentence, a succeeding sentence to the beginning sentence, a changing sentence from a different angle of the logic, and a conclusive sentence in this order, the edit screens may be desirably displayed in the order of the additional information of the drawing segments 42' for the beginning sentence, the additional information of the drawing segments 42' for the succeeding sentence, the additional information of the drawing segments 42' for the changing sentence, and the additional information of the drawing segments 42' for the conclusive sentence.

In the information processing apparatus 10 as described above, the additional data 16 may be specified for the target data 14 after the drawing 40 expressing the meaning segment in the target data 14 is generated. The drawing 40' accounting for the meanings of the target data 14 and the additional data 16 is re-generated and displayed. In this way, the user may more easily learn the contents of the target data 14 in view of the additional data 16. For example, if the target data 14 is the minutes of a meeting, a participant in the meeting may submit additional materials later. By re-generating the drawing 40' that accounts for the additional materials, the user may more easily learn the contents of the minutes including the additional materials.

In a process described in detail below, the extracting unit 32 extracts at least part of the target data 14 after the drawing 40 expressing the target data 14 is displayed.

Figure 14:
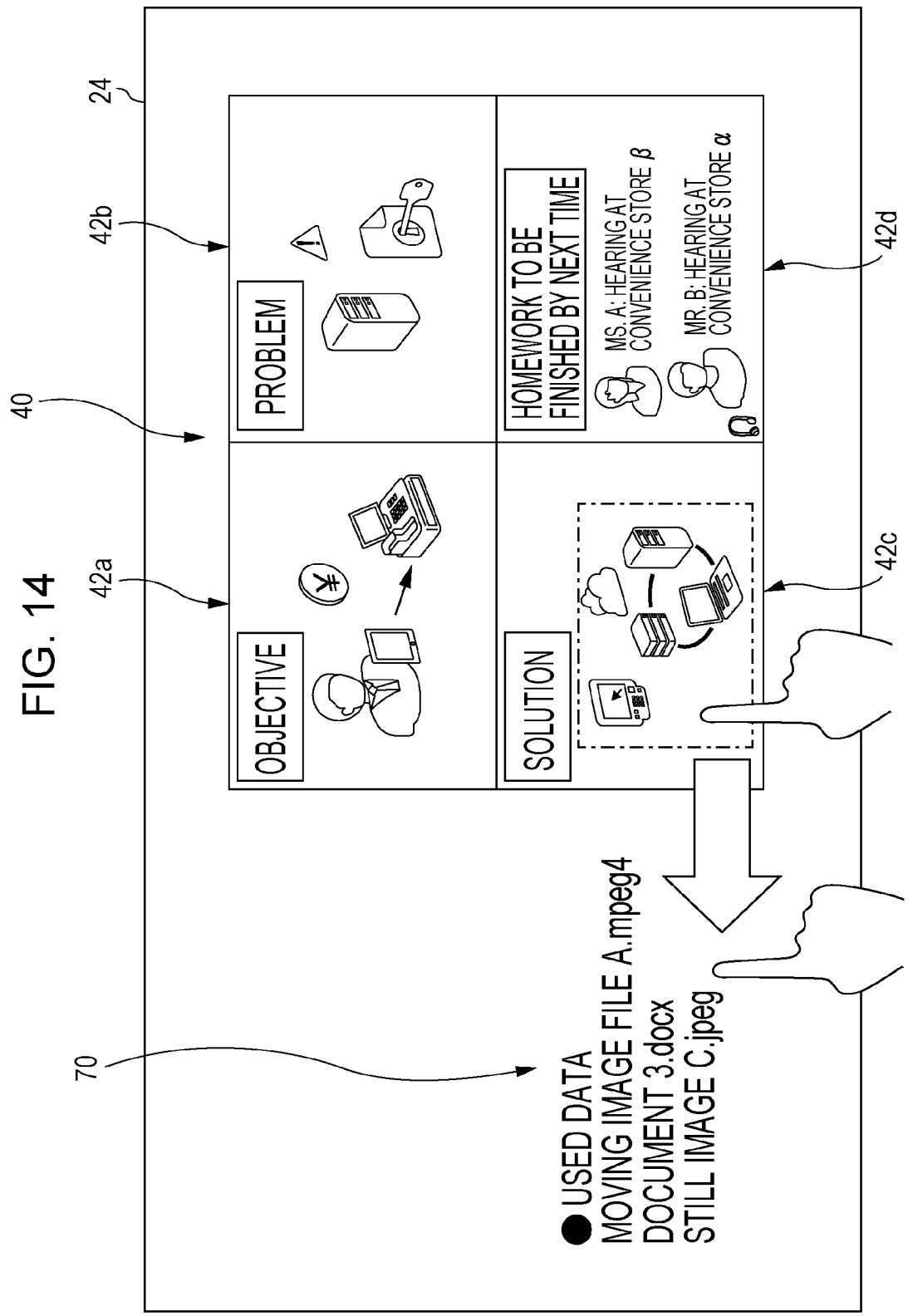
FIG. 14 illustrates how partial data is extracted from the drawing which expresses the meaning of the target data.

FIG. 14 illustrates how the partial data is extracted with a specific portion specified in the drawing 40 expressing the target data 14. When the specific portion as part or whole of the drawing 40 expressing the target data 14 displayed on the display 24 is specified by the user, for example, the extracting unit 32 extracts the partial data that is at least part of the target data 14 that is used to express the specific portion.

In accordance with the exemplary embodiment, part or whole of the drawing 40 is selected as the specific portion, and is moved, on the display 24, from inside the display region of the drawing 40 to outside the display region of the drawing 40. The specific portion is thus specified. Like the movement of the additional data, the movement of the specific portion on the display 24 is performed in a sliding operation or a drag operation.

If the whole drawing 40 is specified as the specific portion, the extracting unit 32 may extract the target data 14 itself. For example, if the user is unable to directly access the target data 14 because the target data 14 is stored on a server or the like, the user may acquire all target data 14 expressed by the drawing 40 by specifying the whole drawing 40 as the specific portion.

Referring to FIG. 14, the drawing 40 includes the multiple drawing segments 42 corresponding to multiple segments of the target data 14. If the drawing 40 includes the drawing segments 42 in this way, the whole drawing segments 42 touched by the user may be selected as the specific portion. As illustrated in FIG. 14, the user touches the drawing segment 42c, and then slides the drawing segment 42c to outside the display region of the drawing 40, the whole drawing segment 42c is specified as the specific portion.

When the specific segment is specified, the extracting unit 32 extracts partial data 70 that is at least part of the target data 14 that is used to express the specific portion. In the example of FIG. 14, the drawing segment 42c is specified as the specific portion. The extracting unit 32 extracts as the partial data 70 a portion expressed by the drawing segment 42c from the target data 14.

A portion of the drawing segments 42 touched by the user may be specified as the specific portion. In such a case, the user may specify part of the drawing segments 42 by circling it with a finger, and may then move the specified portion to outside the display region of the drawing 40. The portion of the drawing segments 42 is thus specified as the specific portion.

When the specific portion is moved from within the display region of the drawing 40 to outside the display region of the drawing 40, the display controller 34 displays the extracted partial data 70 at a destination location of the specific portion. The destination location of the specific portion may be the end point of the sliding operation (the location where the finger or stylus is detached from the touch panel) or the end point of the drag operation (the location where the mouse button is released). In this way, the user may more easily recognize what the extracted partial data 70 is. In the example of FIG. 14, the drawing segment 42c expresses moving file A.mpeg4, document 3.docx, and still image C.jpeg. These pieces of data are extracted as the partial data.

The target data 14 may be different from the partial data 70 in data format. For example, if the target data 14 is a moving image, the partial data 70 may be a still image of one frame of the moving image.

Referring to FIG. 14, the drawing 40 includes multiple drawing segments 42. A drawing expressing the target data 14 from which the partial data 70 is to be extracted may not necessarily have to include multiple segments.

Figure 15:
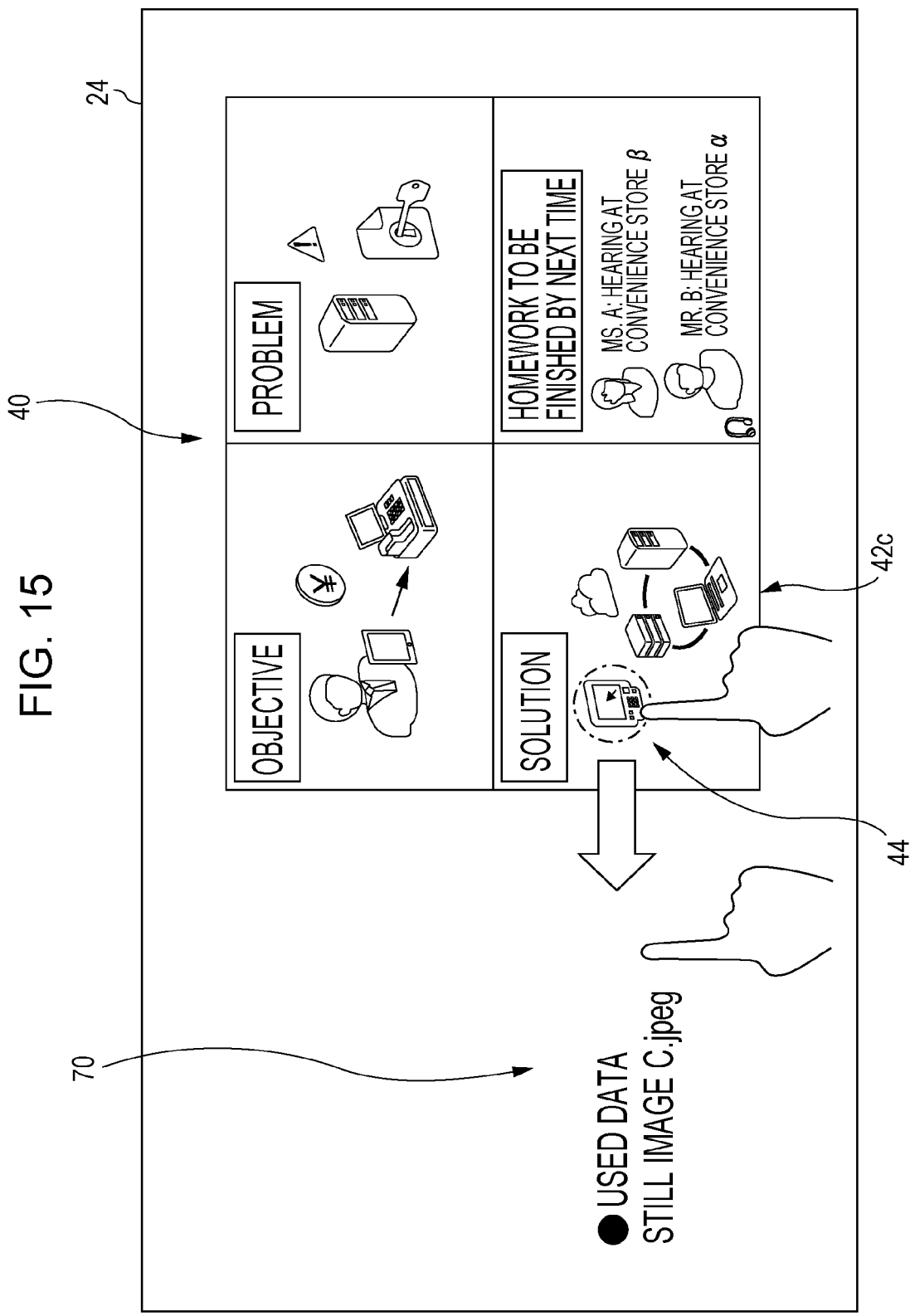
FIG. 15 illustrates how the partial data is extracted, with an element specified, from the drawing expressing the meaning of the target data.

If the drawing 40 includes one or more elements, each element may be specified as a specific portion. FIG. 15 illustrates how the element 44 contained in the drawing 40 is specified as the specific portion. Referring to FIG. 15, the user may specify the element 44 as the specific portion by selecting the element 44 contained in the drawing 40, and by moving the selected element 44 out of the display region of the drawing 40. Multiple elements 44 may be specified as the specific portion.

When the element 44 is specified, the extracting unit 32 extracts the partial data 70 that is at least part the target data 14 that is used to express the specified element 44. Referring to FIG. 15, since the element 44 representing a "mobile terminal" is specified as the specific portion, the extracting unit 32 extracts the partial data 70 expressing the element 44 from the target data 14.

If the element 44 commonly contained in the drawing segments 42 forming the drawing 40 is specified as the specific portion, the extracting unit 32 extracts the partial data 70 that is used to express the specified element 44 from multiple segments corresponding to the drawing segments 42 containing the specified element 44.

Figure 16:
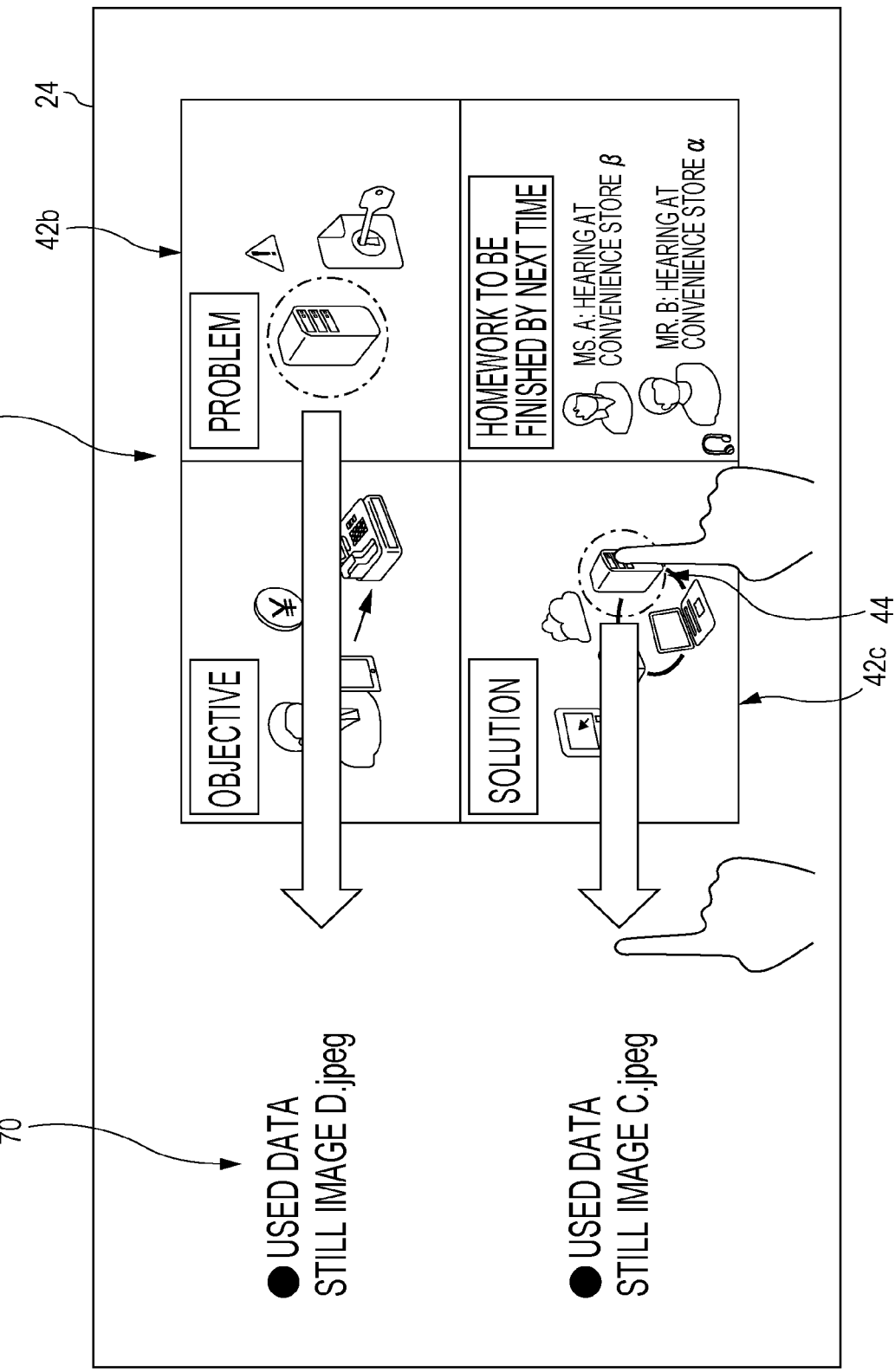
FIG. 16 illustrates how the partial data is extracted when the element commonly shared by multiple drawing segments is specified to be a specific portion.

The element 44 representing the "server" is commonly contained in the drawing segments 42b and 42c in the drawing 40 of FIG. 16. If the user specifies as the specific portion the element 44 representing the "server" contained in one of the drawing segments 42b and 42c, the element 44 representing the "server" contained in the other of the drawing segments 42b and 42c may be automatically specified as the specific portion. The extracting unit 32 extracts as the partial data 70 a portion of the problem as the segment of the target data 14 that corresponds to the drawing segment 42b and that is used to express the element 44 representing the "server". The extracting unit 32 extracts as the partial data 70 a portion of the solution as the segment of the target data 14 that corresponds to the drawing segment 42c and that is used to express the element 44 representing the "server". In this way, multiple pieces of the partial data 70 are extracted.

The specific portion of the drawing 40 may be specified in another way. For example, a voice instruction to specify the specific portion in the drawing 40 may be input to the audio input unit 22.

When the extracting unit 32 has extracted the partial data, the drawing generating unit 30 may re-generate the drawing according to a remaining portion of the target data 14 with the partial data removed, and the display controller 34 may display the re-generated drawing on the display 24.

Figure 17:
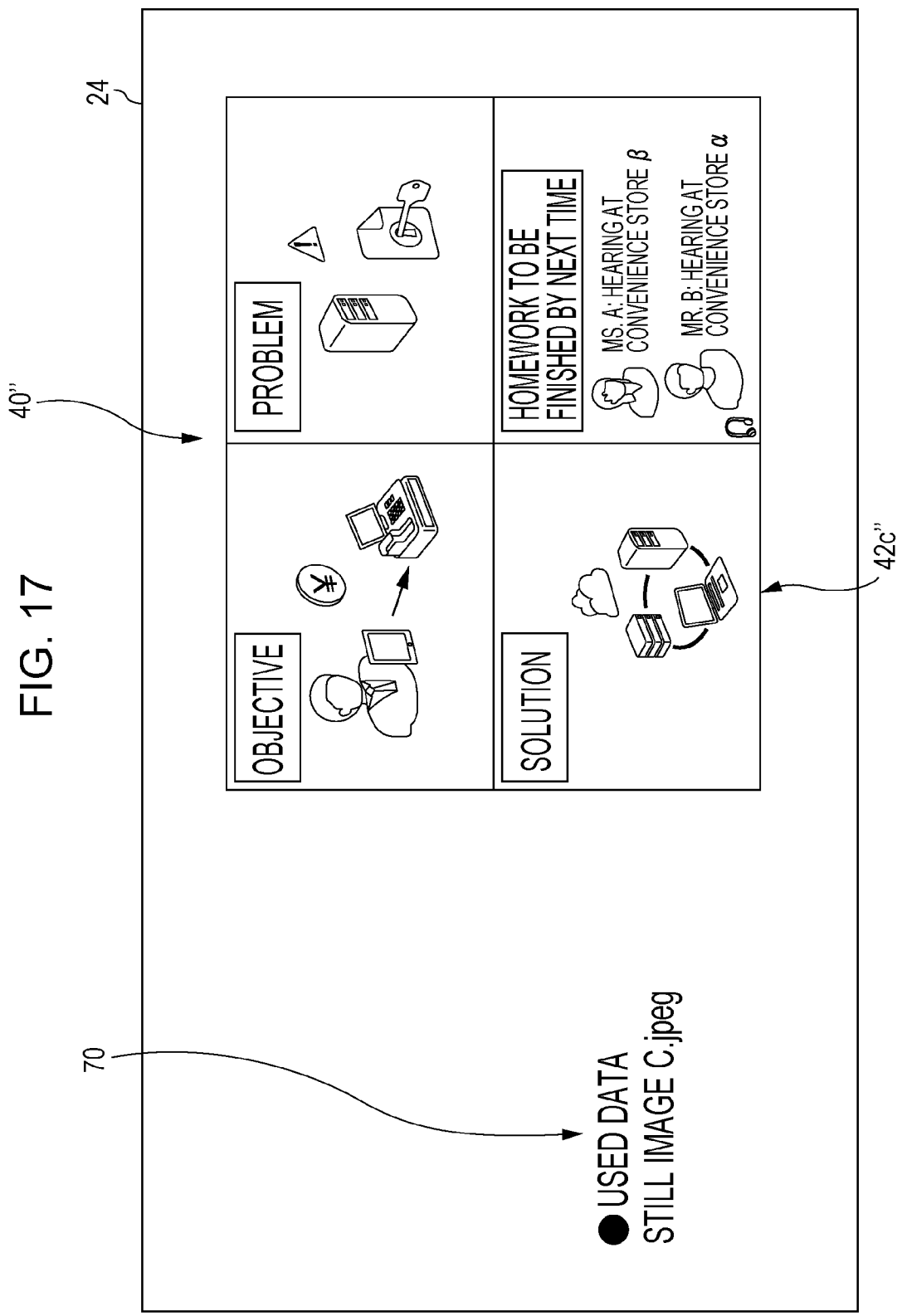
FIG. 17 illustrates the drawing that is re-generated in response to a remaining portion of the target data with the partial data excluded.

FIG. 17 illustrates the drawing segment 42c" that is re-generated by the drawing generating unit 30 (the drawing segment re-generated as a result of the extraction of the partial data is hereinafter generally referred to as the drawing segment 42") when the element 44 representing the "portable terminal" is specified as the specific portion and thus the partial data is extracted from the drawing segment 42c expressing the solution (see FIG. 15). The drawing 40 may include the drawing segments 42 as illustrated in FIG. 17, part or whole of one of the drawing segments 42 may be specified as the specific portion, and the partial data 70 corresponding to the specific portion may be extracted. In such a case, the drawing generating unit 30 re-generates the drawing segment 42" that expresses a remaining portion of the segment of the target data 14 that corresponds to the drawing segment 42 containing the specific portion and is without the partial data 70. For example, the drawing segment 42c" expresses the remaining portion that is obtained by removing the partial data 70 from the contents of the solution as the specific segment of the target data 14. Referring to FIG. 17, in comparison with the drawing segment 42c, the drawing segment 42c" is without the element 44 representing the "portable terminal" specified as the specific portion.

If the contents of the partial data 70 are removed from the contents of the segment of the target data 14 corresponding to the specific portion, the contents of another segment may be affected. For example, if the contents of the partial data 70 are removed from the contents of the solution as the segment corresponding to the specific portion, the contents of the homework to be finished by the next time as another segment may possibly change. Furthermore, the contents of the partial data 70 are removed from the contents of the problem as the segment corresponding to the specific portion, the contents of the solution or the homework to be finished by the next time as another segment may possibly change.

If the drawing 40 includes the drawing segments 42 and the partial data 70 is extracted from the contents of the segment of the target data 14 corresponding to the specific portion, the drawing generating unit 30 may re-generate not only the drawing segment 42c containing the specific portion, but also the drawing segment 42a, 42b, or 42d corresponding to another segment with the contents thereof changing as a result of the extraction of the partial data 70.

Figure 18:
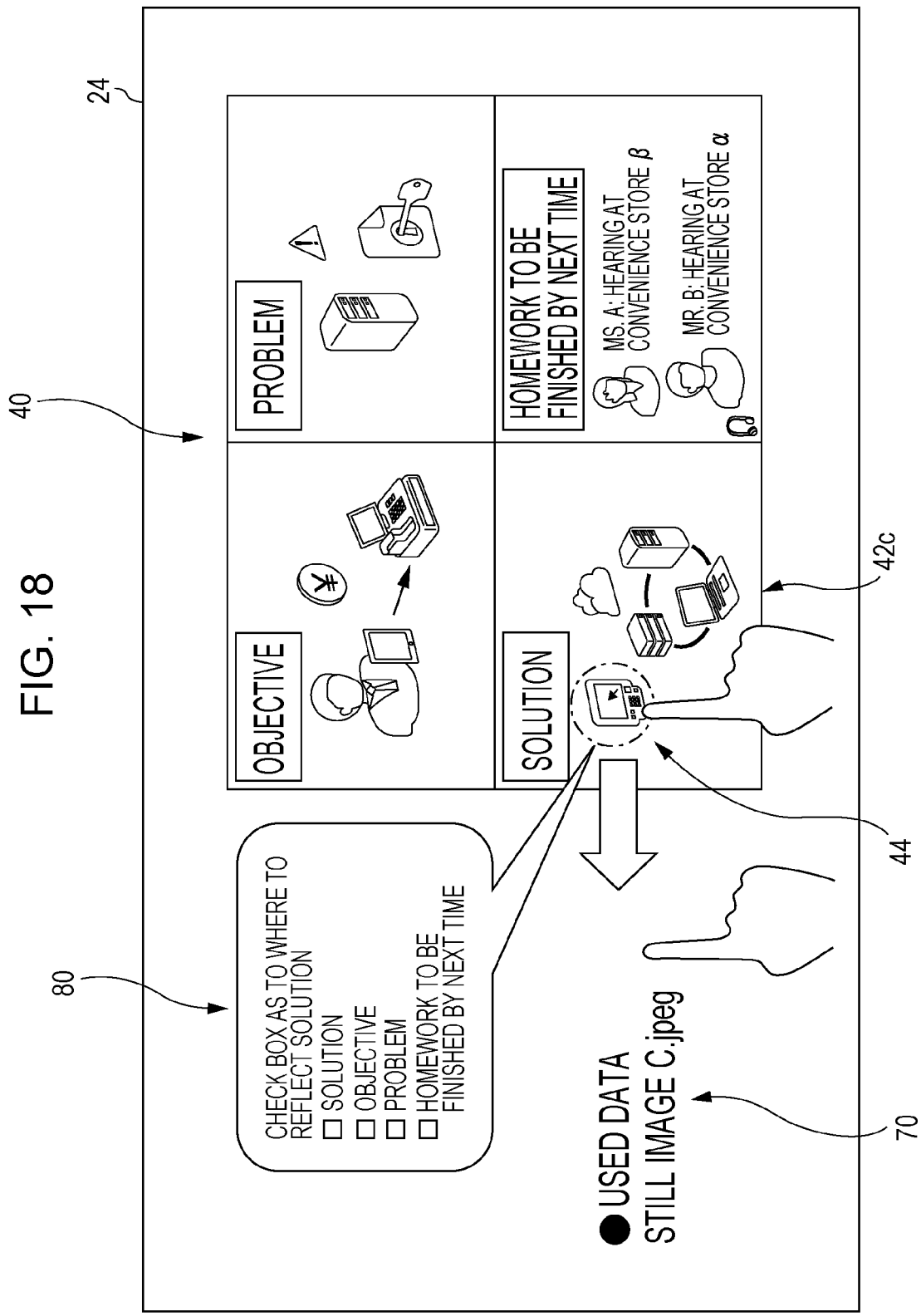
FIG. 18 illustrates an example of a screen that is displayed when the partial data is extracted and that specifies a segment to re-generate the drawing.

The user may select another segment that becomes a drawing re-generation target when the partial data 70 is extracted. Referring to FIG. 18, when the partial data 70 is extracted in accordance with the exemplary embodiment, the display controller 34 displays a second segment selection window 80 that allows the user to select another segment serving as a drawing re-generation target. If the user selects another segment serving as a drawing re-generation target in the segment selection window 80, the drawing generating unit 30 re-generates the drawing segment 42c" of the specific segment and the drawing segments 42" of another selected segment such that the contents of the target data 14 with the partial data 70 removed therefrom are expressed.

Figure 19:
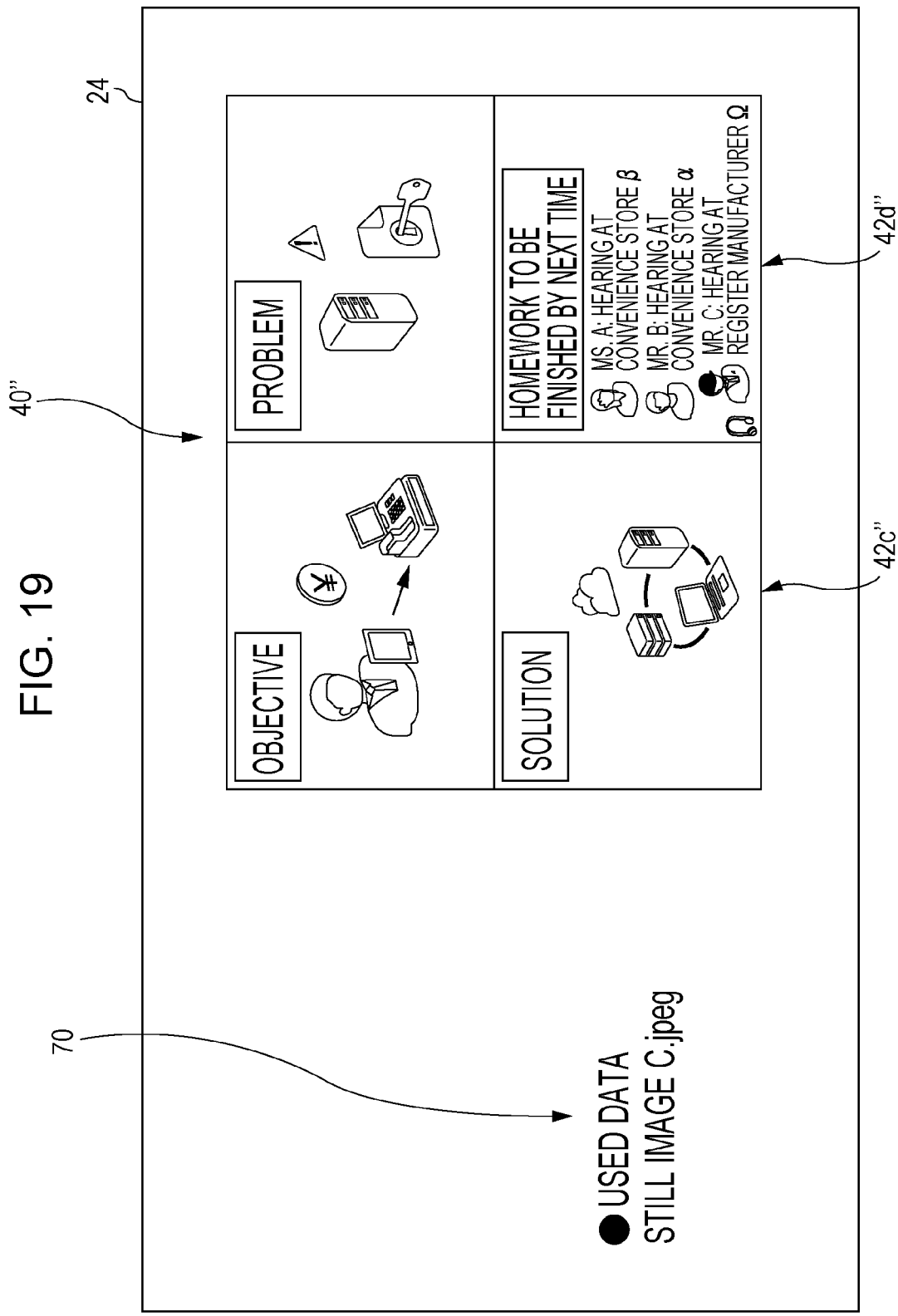
FIG. 19 illustrates a display example of the drawing that is re-generated in response to the meaning of another segment that has been changed when the partial data is extracted from the specified segment.

Referring to FIG. 19, the drawing segment 42c" related to the specific portion and the drawing segment 42d" corresponding to the homework to be finished by the next time as another selected segment are re-generated and displayed, when the element 44 contained in the drawing segment 42c is specified as the specific portion, the partial data 70 is extracted, and the homework to be finished by the next time is selected as another segment in the second segment selection window 80. Since the contents of the solution has changed in the re-generated drawing segments 42d", the homework to be finished by the next time newly includes the hearing at the register manufacturer Ω by Mr. C.

Since the partial data 70 is removed from the target data 14, Mr. C appearing in the target data 14 is affected in meaning as illustrated by the drawing segment 42d". The notification controller 36 thus outputs a notification to Mr. C (via a mail, for example). In this way, Mr. C may more easily learn that the homework to be finished by the next time has changed as a result of removing the partial data 70 from the target data 14.

Another segment serving as a drawing re-generation target with the partial data 70 extracted may be automatically determined rather than via the user's selection. More specifically, the drawing generating unit 30 may automatically select in the target data 14, as a drawing re-generation target, another segment with the meaning thereof changing in concert with a change in the meaning of the segment with the partial data 70 removed.

The user may set whether the drawing re-generation target with the partial data 70 extracted includes only the drawing segment 42 containing the specific portion or further includes the drawing segments 42 of another segment.

Figure 20:
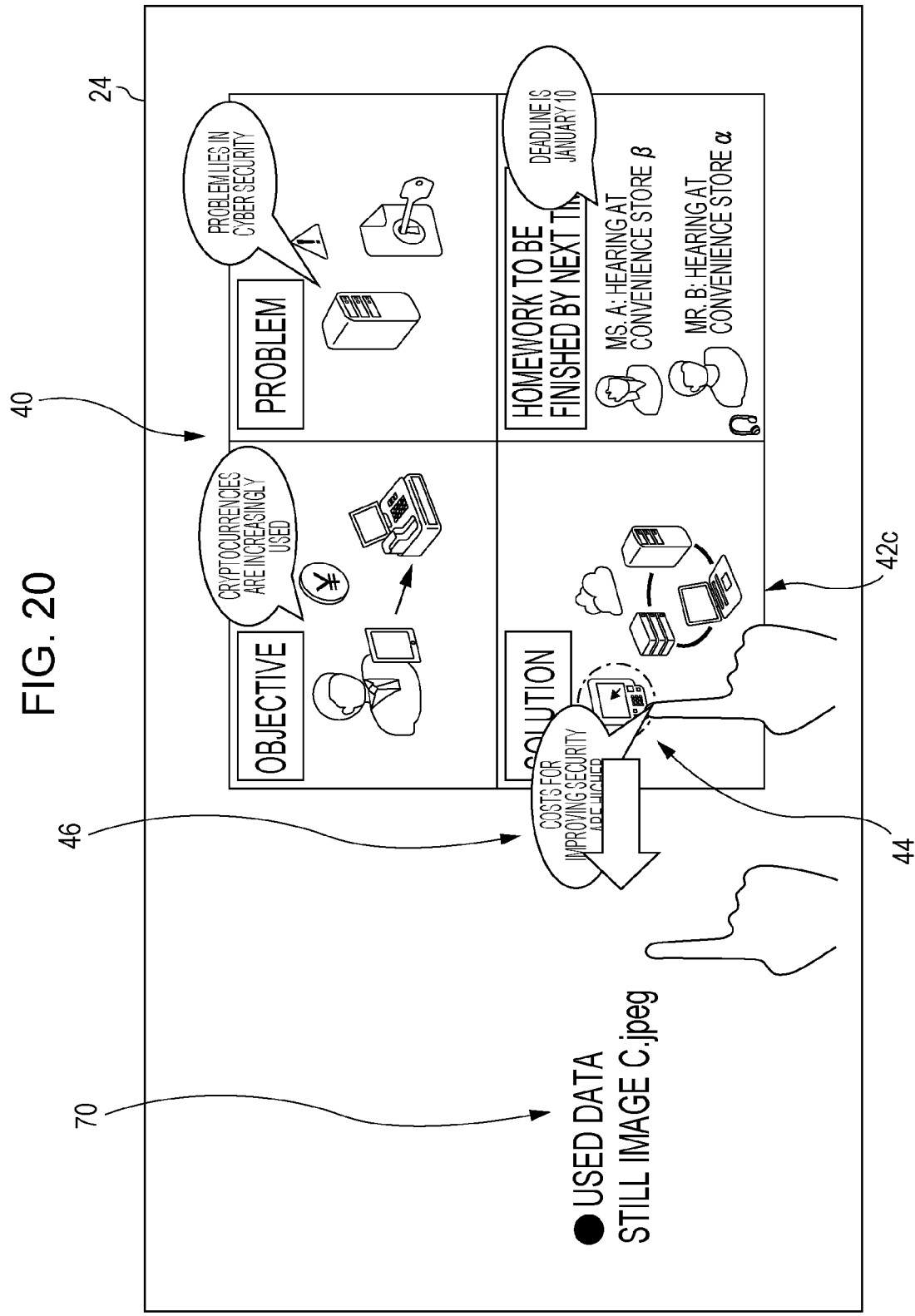
FIG. 20 illustrates how the partial data is extracted from the drawing including the expression of the additional information.
Figure 21:
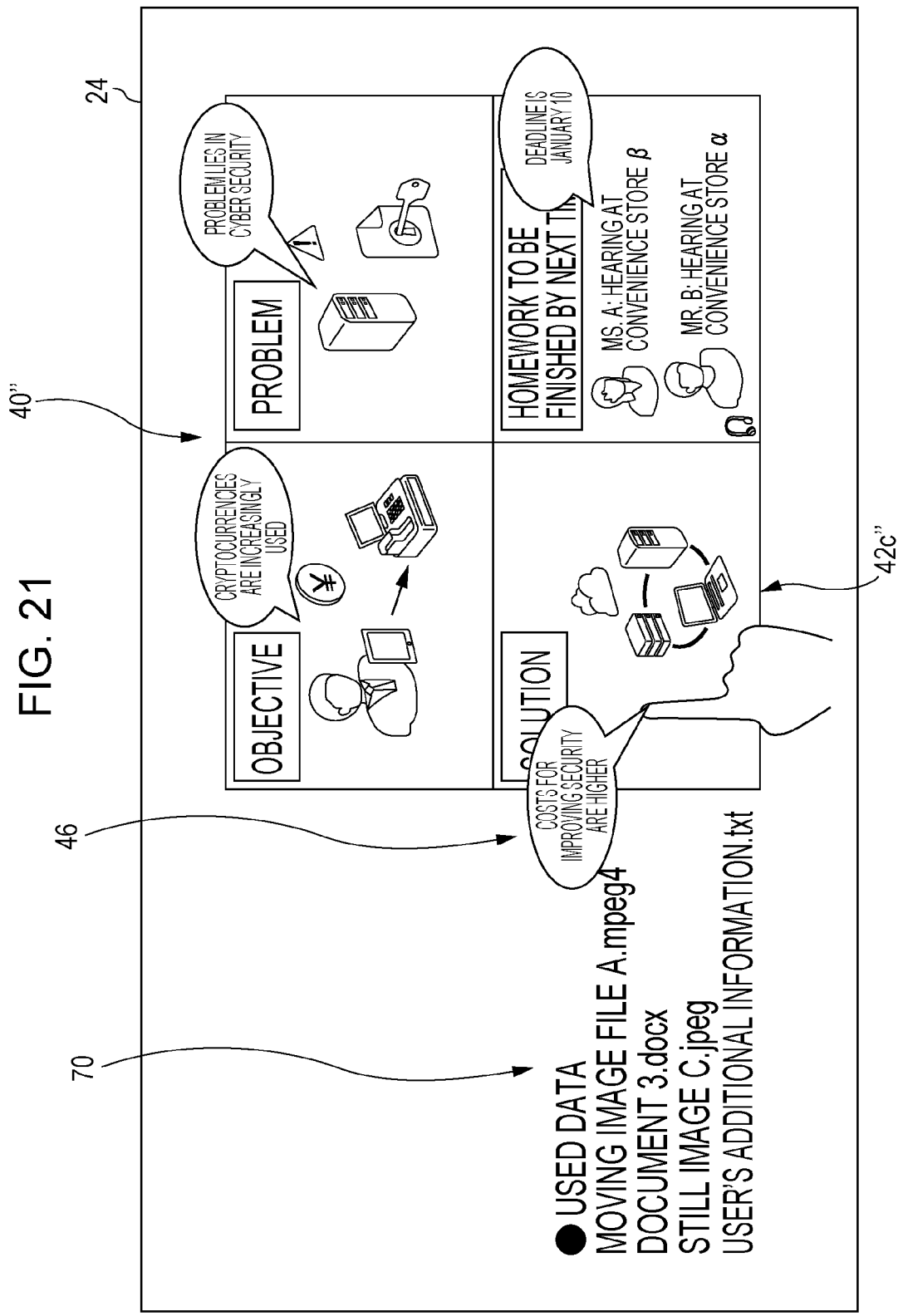
FIG. 21 illustrates a display example of the drawing that is re-generated in response to the remaining portion of the target data with the partial data removed, when the partial data is extracted with the expression of the additional information unmodified.

Referring to FIG. 20, if the specific portion is specified in the drawing 40 containing the expression 46 of the additional information, the additional information is not contained in the target data 14, and the extracting unit 32 may not necessarily extract the additional information as the partial data 70. On the other hand, if the specific portion is specified in the drawing 40 containing the expression 46 of the additional information, the extracting unit 32 may extract the partial data 70 containing the additional information. Referring to FIG. 21, the additional information "user's additional information.txt" is extracted as the partial data 70.

Even if the partial data 70 is extracted with the specific portion specified for the drawing 40 containing the expression 46 of the additional information, the drawing generating unit 30 handles the drawing 40 as a drawing re-generation target. FIG. 21 displays a first display example of the drawing 40" that is re-generated when the partial data 70 has been extracted with the specific portion specified for the drawing 40 containing the expression 46 of the additional information. In accordance with the exemplary embodiment, the comparison of FIG. 21 with FIG. 20 indicates that the drawing generating unit 30 re-generates the drawing 40" without modifying the expression 46 of the additional information contained in the drawing 40 before the partial data 70 is extracted.

Figure 22:
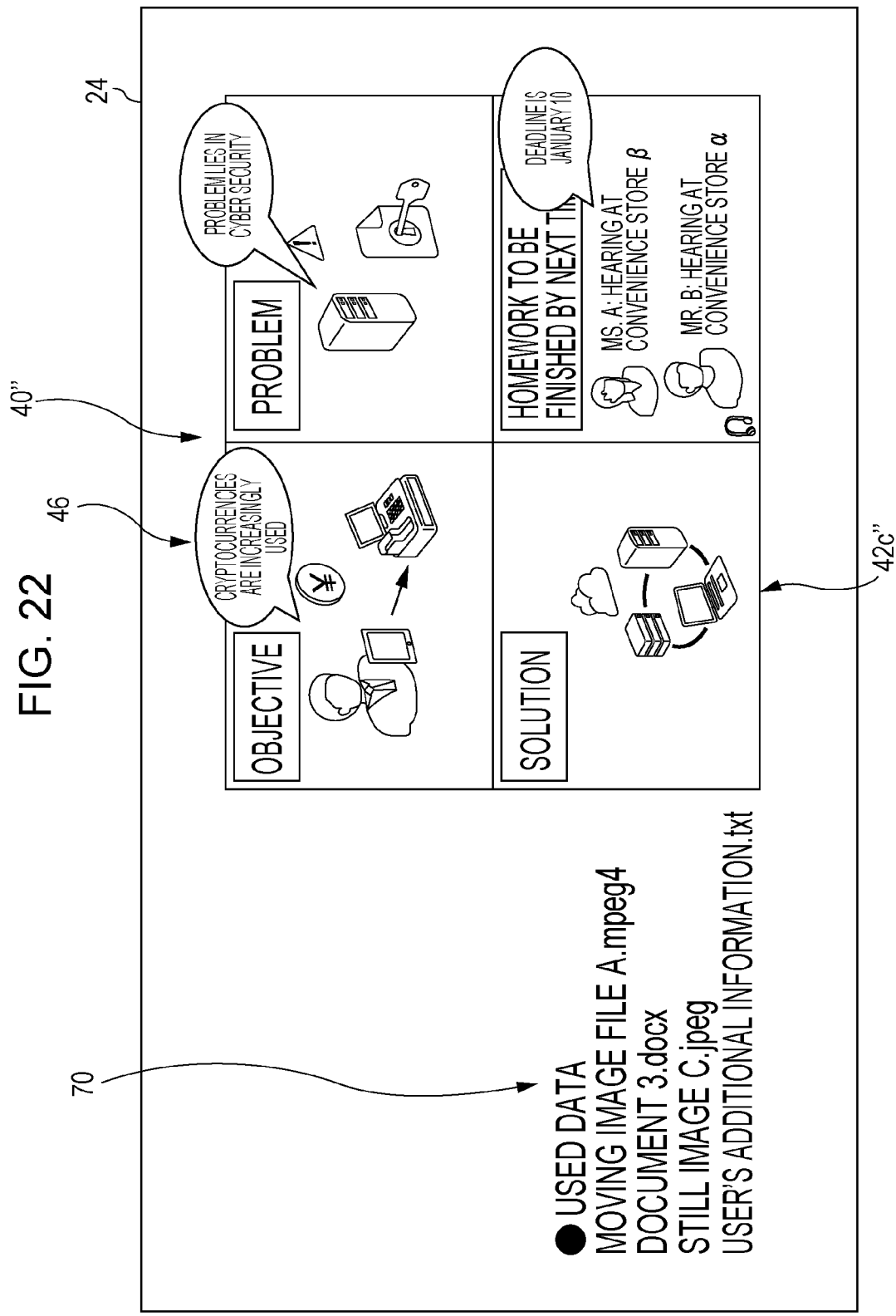
FIG. 22 illustrates a display example of the drawing without the expression of the additional information, wherein the drawing has been re-generated in response to the remaining portion of the target data equal to the target data without the partial data when the partial data is extracted.

FIG. 22 illustrates a second display example of the drawing 40" that has been re-generated with the specific portion specified for the drawing 40 containing the expression 46 of the additional information and with the partial data 70 extracted. Referring to FIG. 22, the drawing generating unit 30 may re-generate the drawing 40" that does not contain the expression 46 of the additional information contained in the drawing 40 before the partial data 70 is extracted. Referring to FIG. 22, since part of the drawing segment 42c is specified as the specific portion, only the drawing segment 42c" is re-generated. In the drawing segment 42c", the expression 46 of the additional information contained in the drawing segment 42c is deleted. This controls an inconsistency that could occur between the display contents of the drawing segment 42c" and the contents of the expression 46 of the additional information attached to the drawing segment 42c".

Figure 23:
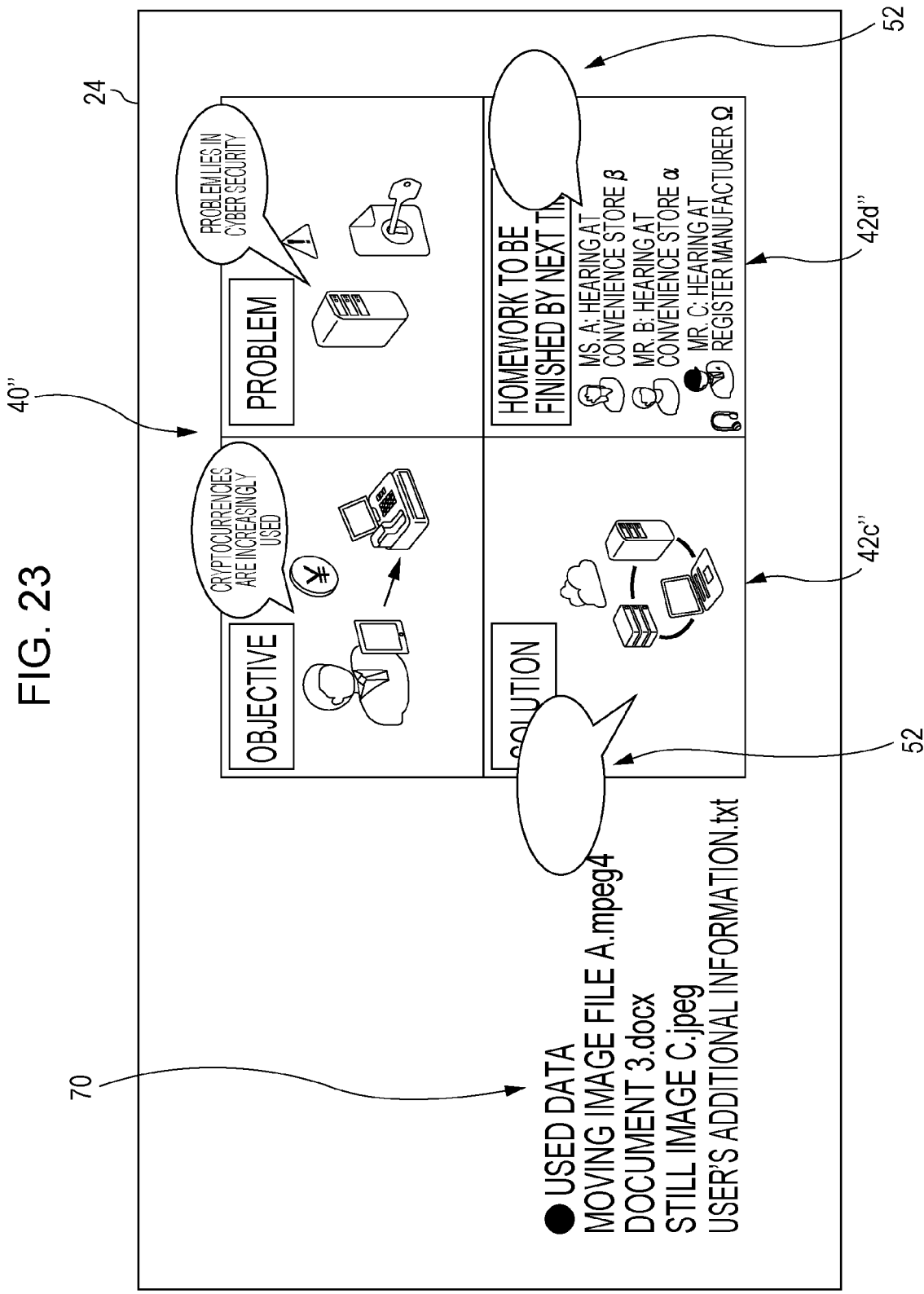
FIG. 23 illustrates an example of an edit screen of the additional information which is displayed when the partial data is extracted.

The display controller 34 may display on the display 24 a screen prompting the user to edit the additional information when the drawing 40" is displayed that is re-generated with the specific portion specified for the drawing 40 containing the expression 46 of the additional information and with the partial data 70 extracted. FIG. 23 illustrates a display example of the screen prompting the user to edit the additional information. Referring to FIG. 23, part of the drawing segment 42c is specified as the specific portion and the partial data 70 is extracted. In response, the drawing segment 42c" related to the specific portion and the drawing segment 42d" related to another segment are re-generated. The display controller 34 deletes the expression 46 of the additional information contained in the drawing segment 42c in the re-generated drawing segment 42c", and newly displays a comment entry column 52 that allows the user to enter the additional information (a comment herein) in the drawing segment 42c". Similarly, the display controller 34 deletes the expression 46 of the additional information contained in the drawing segment 42d, and newly displays a comment entry column 52 that allows the user to enter the additional information in the drawing segment 42d".

As with the case in which the drawing 40' is re-generated with the additional data 16 added, the comment entry column 52 that allows the user to enter the additional information may be a screen other than the screen illustrated in FIG. 23. Before displaying to the user the screen prompting the user to edit the additional information, a confirmation screen having a message reading "Do you edit the comment because the drawing is re-generated?" may be displayed, and then the screen prompting the user to edit the additional information may be displayed after the user has confirmed.

Referring to FIG. 23, the additional information for the drawing segment 42c" and the additional information for the drawing segment 42d" are concurrently editable. In the same way as the drawing 40' is re-generated with the additional data 16 added, multiple drawing segments 42" are re-generated, edit screens of the additional information for the drawing segments 42" may be successively displayed in order to allow the user to successively edit multiple pieces of the additional information for the drawing segments 42". In this case, the display order of the edit screens for the additional information is desirably determined in accordance with the relationship of the segments of the target data 14 responsive to the re-generated drawing segments 42".

In the information processing apparatus 10 as described above, the specific portion is specified in the drawing 40 after the drawing 40 expressing the meaning segment in the target data 14 is generated. At least part of the target data 14 used to express the specific portion may be extracted as the partial data. For example, if the target data 14 is the minutes of a meeting, the user learns the summary of the minutes via the drawing 40, and checks the partial data 70 with a desired portion thereof specified and extracted as the specific portion. The user is thus able to more easily check the details of the desired portion. The partial data 70 as part of the target data 14 is thus more easily used for a variety of purposes. Since the drawing 40" is re-generated from the remaining portion of the target data 14 with the partial data 70 removed therefrom, the partial data 70 may be extracted and used to re-generate the drawing 40" with part of the generated drawing 40 removed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
   generate and display on a display a drawing that expresses a meaning of target data; and
   extract partial data that is at least part of the target data used to express a specific portion, which is in part or in whole of the drawing, in response to the specific portion being specified,
   wherein the processor is configured to display the drawing including an expression of additional information that is not included in the target data, and not extract the additional information as the partial data, wherein if the drawing generated in accordance with a remaining portion of the target data with the partial data removed therefrom is displayed after the drawing including the expression of the additional information is displayed, the processor is configured to display a screen prompting a user to edit the additional information on the display.

2. The information processing apparatus according to claim 1, wherein the processor is configured to display a plurality of drawings expressing meanings of a plurality of meaning segments of the target data, and
extract the partial data that has been used to express the drawing that is specified to be the specific portion, from among the drawings.

3. The information processing apparatus according to claim 2, wherein the drawing comprises one or more elements, and
wherein if the element is specified to be the specific portion, the processor is configured to extract the partial data that has been used to express the specified element.

4. The information processing apparatus according to claim 3, wherein if the element commonly included in the drawings is specified to be the specific portion, the processor is configured to extract the partial data used to express the specified element from each of the meaning segments corresponding to the drawings including the specified element.

5. The information processing apparatus according to claim 1, wherein if the partial data is extracted, the processor is configured to display the drawing that has been generated in accordance with a remaining portion of the target data as a result of removing the partial data.

6. The information processing apparatus according to claim 5, wherein if the drawings expressing the meanings of the meaning segments of the target data are displayed, part or whole of one of the drawings is specified to be the specific portion, and the partial data corresponding to the specific portion is extracted, the processor is configured to display the drawing that has been generated in accordance with a remaining portion of the meaning segment corresponding to the drawing including the specific portion with the partial data removed.

7. The information processing apparatus according to claim 6, wherein the processor is configured to display the drawing that has been re-generated in response to meanings of meaning segments other than the meaning segment, the meaning of the other meaning segments changing by removing the partial data from the meaning segment corresponding to the drawing containing the specific portion.

8. The information processing apparatus according to claim 7, wherein the other meaning segments from which the drawing is generated is selectable by a user.

9. The information processing apparatus according to claim 7, wherein the processor is configured to display the drawing that has been re-generated in response to the changed meanings of the other meaning segments, with the meanings of the other meaning segments changing in concert with a change in the meaning of the meaning segment with the partial data removed therefrom.

10. The information processing apparatus according to claim 1, wherein the processor is configured to extract the partial data by moving the specific portion from inside a display region of the drawing to outside the display region on the display.

11. The information processing apparatus according to claim 10, wherein the processor is configured to display the partial data at a location of a destination of the specific portion.

12. The information processing apparatus according to claim 1, wherein if the partial data is extracted after the drawing including the expression of the additional information is displayed, the processor is configured to display, without modifying the expression of the additional information, the drawing that has been generated in accordance with a remaining portion of the target data with the partial data removed therefrom.

13. The information processing apparatus according to claim 1, wherein if the partial data is extracted after the drawing including the expression of the additional information is displayed, the processor is configured to display the drawing that has been generated in accordance with a remaining portion of the target data with the partial data removed therefrom, and that does not include the expression of the additional information.

14. The information processing apparatus according to claim 1, wherein the target data is different from the partial data in a data format.

15. The information processing apparatus according to claim 1, wherein the processor is further configured to receive a voice instruction specifying the specific portion.

16. The information processing apparatus according to claim 5, wherein the processor is further configured to output a notification concerning an appearing object if the appearing object is affected in meaning by removing the partial data when the drawing is generated by extracting the partial data, and the appearing object in the target data is expressed by the drawing.

17. A non-transitory computer readable medium storing a program causing a computer to execute a process for processing information, the process comprising:
generating and displaying on a display a drawing that expresses a meaning of target data; and
extracting partial data that is at least part of the target data used to express a specific portion, which is in part or in whole of the drawing, in response to the specific portion being specified,
wherein the drawing including an expression of additional information that is not included in the target data is displayed, and the additional information is not extracted as the partial data,
wherein if the drawing generated in accordance with a remaining portion of the target data with the partial data removed therefrom is displayed after the drawing including the expression of the additional information is displayed, a screen prompting a user to edit the additional information is displayed on the display.

* * * * *